(12) United States Patent
Salomon et al.

(10) Patent No.: US 11,061,937 B2
(45) Date of Patent: Jul. 13, 2021

(54) METHOD AND SYSTEM FOR CLASSIFYING USER IDENTIFIERS INTO SIMILAR SEGMENTS

(71) Applicant: salesforce.com, inc., San Francisco, CA (US)

(72) Inventors: Yacov Salomon, Danville, CA (US); Jonathan Purnell, Natick, MA (US); Wanderley Liu, Sunnyvale, CA (US); Kexin Xie, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 197 days.

(21) Appl. No.: 16/144,715

(22) Filed: Sep. 27, 2018

(65) Prior Publication Data
US 2020/0104408 A1    Apr. 2, 2020

(51) Int. Cl.
| *G06F 16/00* | (2019.01) |
| *G06F 16/28* | (2019.01) |
| *G06Q 30/02* | (2012.01) |
| *G06F 16/907* | (2019.01) |
| *G06F 16/9535* | (2019.01) |
| *G06F 16/34* | (2019.01) |

(52) U.S. Cl.
CPC .......... *G06F 16/287* (2019.01); *G06F 16/285* (2019.01); *G06F 16/907* (2019.01); *G06F 16/9535* (2019.01); *G06Q 30/0201* (2013.01); *G06F 16/345* (2019.01)

(58) Field of Classification Search
CPC .... G06F 16/285; G06F 16/287; G06F 16/735; G06F 16/907; G06F 16/9535; G06F 3/0481; G06F 16/335; G06F 16/9035; G06Q 30/0204; G06Q 30/0201; G06Q 30/0277; G06Q 30/0269; G06Q 30/0251; G06Q 30/0254
See application file for complete search history.

(56) References Cited

U.S. PATENT DOCUMENTS

| 8,655,695 | B1 * | 2/2014 | Qu ..................... G06Q 30/0251 705/14.49 |
| 2008/0228768 | A1 * | 9/2008 | Kenedy ................. G06Q 40/00 |
| 2012/0042262 | A1 * | 2/2012 | Priyadarshan ..... G06Q 30/0269 715/745 |

(Continued)

FOREIGN PATENT DOCUMENTS

JP    4962950 B2 *    6/2012 ............. G06F 17/30

*Primary Examiner* — Augustine K. Obisesan
(74) *Attorney, Agent, or Firm* — Holland & Hart LLP

(57) ABSTRACT

A database system performs lookalike analysis on a data set including a plurality of user identifiers, which are associated with one or more attribute records. The database system classifies the user identifiers into one or more segments of user identifiers based on the attribute records. The database system performs Linear Discriminant Analysis (LDA) to calculate a measure of importance of the attribute records relative to the one or more segments. The database system auto-correlates the attribute records based on the numbers of attribute records in the user identifier population and the one or more segments. The database system identifies a set of user identifiers relative to one or more segments using the measures of importance and the auto-correlated parameters.

18 Claims, 12 Drawing Sheets

(56) References Cited

U.S. PATENT DOCUMENTS

| | | | |
|---|---|---|---|
| 2014/0257932 A1* | 9/2014 | Joa | G06Q 30/0204 |
| | | | 705/7.34 |
| 2016/0253689 A1* | 9/2016 | Milton | G06Q 30/0205 |
| | | | 705/7.34 |
| 2017/0140283 A1* | 5/2017 | Cheng | G06N 20/00 |
| 2019/0080352 A1* | 3/2019 | Modarresi | H04L 67/22 |

\* cited by examiner

US 11,061,937 B2

METHOD AND SYSTEM FOR CLASSIFYING USER IDENTIFIERS INTO SIMILAR SEGMENTS

FIELD OF TECHNOLOGY

The present disclosure relates generally to database systems and data processing, and more specifically to identifying user lookalikes in a database system.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, the cloud platform may support identification of similar users based on attributes associated with the users. For example, a database system may determine similarities between a group of users associated with a particular attribute and many different users associated with one or more additional attributes. However, such systems may not contemplate correlated attributes or may utilize significant resources in determining specific correlations between various attributes.

DETAILED DESCRIPTION

Figure 1:
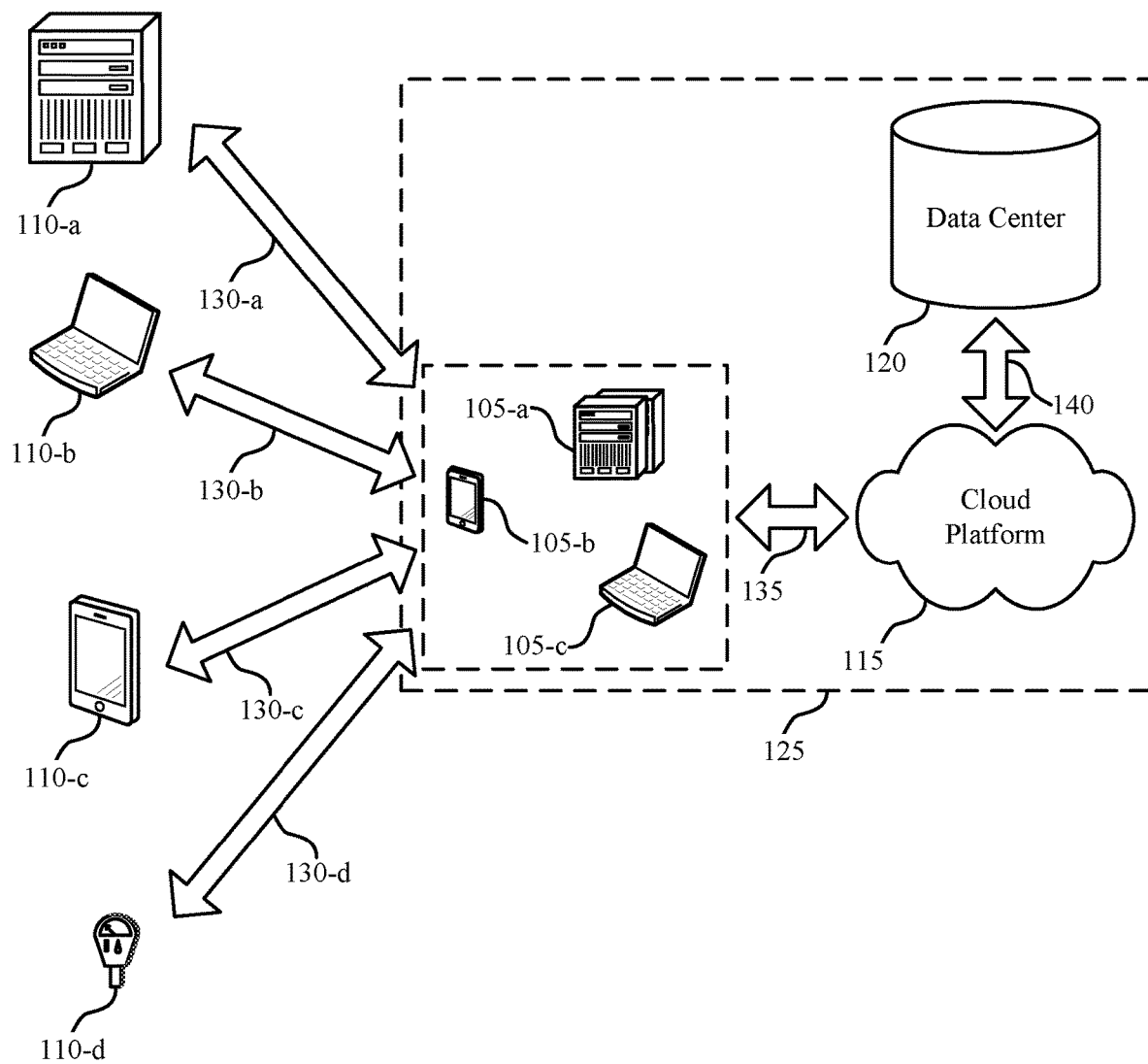
FIG. 1 illustrates an example of a system for database processing that supports identifying user lookalikes in a database system in accordance with aspects of the present disclosure.

Some database systems may perform lookalike identification on data sets to identify related user identifiers relative to one or more groups of user identifiers based on attributes associated with the identifiers. Lookalike user identifiers may be useful to users for many customer relationship management (CRM) operations, such as marketing analysis or sales tracking. A data set may include a plurality of user identifiers (e.g., data objects) that are each associated with one or more attributes. These attributes may be based on user behavior data associated with a user device. For example, a user identifier may be associated with a "sports fan" attribute based on web-behavior data corresponding to a user device associated with the user. Example web-behavior data may include data corresponding to visits to sport websites over a period of time. The database system may identify lookalike user identifiers using one or more similarity calculation techniques. In some cases, the database system may identify attributes that correlate to membership in one or more categories (e.g., segments) by user identifiers. For example, the user identifiers that are associated with the "sports fan" attribute are designated as a base segment, and the database system identifies other attributes that may signal membership in the "sports fan" base segment. For example, an attribute such as "purchased sporting event ticket in last six months" may have a high correlation with user identifiers of the "sports fan" base segment, while an attribute such as "purchased car in the last six months" may have no or an inverse correlation to the users of the "sports fan" base segment. These attribute correlations are used to identify other user identifiers that are similar to the "sports fan" base segment as lookalike users. The identified lookalike users may be useful for marketing purposes. For example, a client (e.g., a business) marketing to users with the "sports fan" attribute may wish to expand its marketing footprint, and thus may also market to the users that "look like" the users of the sports fan segment.

In some cases, a database system may automatically identify lookalike user identifiers relative to one or more groups of user identifiers in one or more data sets based on a configuration of the database system. The database system may classify a plurality of user identifiers into one or more segments based on attribute records associated with the user identifiers. In some cases, a segment includes the user identifiers associated with a particular attribute record. Using a Linear Discriminant Analysis (LDA) approach, for each segment of user identifiers, the database system may calculate a measure of importance for each attribute record in the data set relative to membership in a segment. A correlation factor is determined for the data set based on an average degree of overlap between the attribute records and the one or more segments of user identifiers. The correlation factor is utilized to adjust the measures of importance calculated for each attribute relative to the segments, such that the measures of importance reflect patterns of similarity in the data set. For example, certain data sets may have high degrees of correlation (e.g., related attributes), while other data sets may have little correlation (e.g., unrelated attributes). After a data set is adjusted for correlation, lookalike user identifiers may be identified relative to one or more segments. Because relative importance of attributes are determined for the data set, the data processing machine may not identify some user identifiers as a lookalike identifiers, because the attributes are not correlated to attributes of user identifier associated with a particular segment. Accordingly, the data set provides for more efficient processing via utilization of relevant attributes in determining lookalike user identifiers. Furthermore, because of the amount of data in a data set to process, it is prohibitive (e.g., resource expensive) to calculate specific correlations for the attributes of the data set. Accordingly, the implementations described herein provide for a correlation approximation, which is less resource intensive than determining specific correlations.

In some cases, the data processing machine identifies lookalike users via a prospecting approach with new data. For example, new user data corresponding to new attributes for known users (e.g., known to a data management platform) may be received at the data processing machine. Data regarding users collected by the same data management platform may be referred to as second party or 2p data. The new attributes may be associated with known user identifiers, and the importance measures may be calculated for the new attributes. Using the importance measures for the new attributes, the user identifier similarities (e.g., lookalike users) are calculated relative to one or more segments using the calculated correlation factor. In some cases, the data processing machine receives or identifies additional data corresponding to unknown users with attributes from an external data management platform or another party (referred to as third party data or 3p data). When 3p data is received by the data processing machine, the data processing machine may modify the domain for determining measures of importance for each attribute. Thus, a client-domain specific model may be generated for the known and new data.

In some cases, the data processing machine may receive new attribute data and determine that the change in the user attribute model based on the new attribute data is too significant for a particular use case. For example, a client that utilizes a segment of users having the sports fan attribute for advertising purposes may prefer that the number of user identifiers associated with the segment remain relatively stable or that the particular user identifiers associated with the segment remain relatively stable. Accordingly, the data processing machine may identify when addition of new data to the user attribute model may significantly affect the balance of user identifier segments and may prevent modification of the user attribute model by not updating the user attribute model with the new data.

Aspects of the disclosure are initially described in the context of an environment supporting an on-demand database service. Additional aspects of the disclosure are described with reference to a database system and processes for identifying lookalike user identifiers. Aspects of the disclosure are further illustrated by and described with reference to apparatus diagrams, system diagrams, and flowcharts that relate to identifying user lookalikes in a database system.

FIG. 1 illustrates an example of a system 100 for cloud computing that supports identifying user lookalikes in a database system in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some systems 100, a data center 120 may perform lookalike analysis on data sets to identify similarities between segments of user identifiers. These similarities may be useful to users (e.g., cloud clients 105, contacts 110, etc.) for many CRM operations, such as marketing analysis or sales tracking. In some cases, a data center 120 may automatically determine similarities for one or more segments based on a configuration of the data center 120. In other cases, the data center 120 may receive a command from a cloud client 105 to determine similarities for a data set. The data center 120 may determine the similarities within a data set using one or more lookalike identifying techniques. For example, for improved efficiency for calculation of correlations of attributes associated with user identifiers, the data center 120 may approximate correlation using an auto-correlation technique using data attributes scored using LDA. Rather than determining specific correlations, the correlation approximation may support faster similarity calculations on a large data set. For example, because the data center 120—or, more specifically, a data processing machine (e.g., a bare-metal machine, virtual machine, or container) at the data center 120—generates a correlation factor (e.g., a correlation approximation) that may be applied to one or more importance measurements corresponding to attributes, the data center 120 can identify relevant lookalike user identifiers without calculating specific correlations for many attributes.

In some cases, a system may identify lookalike users without accounting for correlations between attributes. When a system does not account for correlated attributes, the resultant lookalike user identifiers may not be as relevant as lookalike users identified using a system that accounts for correlation of attributes. In some cases, a system calculates correlations between many different attributes, but such calculations are processor and memory intensive when the data set includes thousands or millions of data objects (e.g., user identifiers) and many attribute records associated with the data objects. Also, in some systems, new data (e.g., new data objects and/or new attributes) may be added to the data set, and the system determines similar objects without adjusting the domain for calculating importance of attributes relative to segments, which may generate results biased in favor of the original data set.

The system 100 may support a computing resource efficient and accurate lookalike identification system that determines importance of particular attributes, accounts for correlations between attributes, adjusts a domain for new data, and identifies situations in which the addition of new data to the model may be counter to a client's interest. The system performs LDA to determine how various features inform membership in different segments of user identifiers. For one or more segments of user identifiers, the system 100 determines whether particular attributes are found more or less often in the segment or the general population of user identifiers (e.g., the user population). In some cases, the system 100 calculates the probability of membership in a particular segment by user identifier that has a particular attribute. For example, a user having an attribute "A" has a 30% chance of being categorized in a particular segment.

This calculation may be referred to a presence feature perspective calculation. In some cases, the system 100 calculates the probability of a user not having a particular attribute of being categorized in a particular segment. For example, a user not having an attribute "B" has a 60% chance of being classified in a particular segment. Such a calculation may be referred to as an absent feature perspective calculation. These and other calculations are utilized to determine how a particular attribute performs at separating a base segment from the user population. For example, if a feature overlaps with 50% of the base segment and 50% of the user population, then the feature is not informative of the segment. Similarly, if an attribute overlaps with 85% of a base segment and 10% of the user population, then the attribute may be highly informative of the segment. In some cases, the system 100 identifies an attributes strength of signal relative to a base segment and the relative size of the impacted population (e.g., measure of importance) and orders the attributes by their ability to separate a base segment from the total population.

As a next step in the process, the system 100 determines the correlation of various attributes. To determine the correlation, the system 100 calculates how large a base segment is relative to the user population, which informs the system how likely a user is to be in a base segment given no other information. For each feature, the system 100 determines the degree of overlap of feature with the base segment. The system 100 then calculates an average overlap across the feature space. The average overlap is utilized as a basis for a correlation factor and determines a proxy for correlation between features. These calculations may be performed for many base segments of the user population. Correlation parameters are applied to the average overlap based on client preferences to determine the correlation factor, and the correlation parameters (e.g., $\alpha$ and $\beta$) are client specific and determined using an auto-regression analysis. The correlation factor is applied to adjust the measures of importance for the attributes to generate a correlated model. Using the correlated model, the system 100 identifies lookalike user identifiers relative to one or more segments of user identifiers. The lookalike user identifiers may be determined based on similarity scores between user identifiers that are classified in a particular segment and user identifiers that are not classified to the segment.

In some cases, lookalike user identifiers may be identified from other data sets. For example, the cloud platform 115 may collect, store, and analyze data for many cloud clients 105 and the data may include data associated with cloud contacts 110. Lookalike users be identified within data associated with a specific cloud client 105. Such data may be referred to as first party or 1p data. Lookalike identifiers may also be identified between data associated with different cloud clients 105. For example, lookalike user identifiers from data associated with cloud client 105-b may be identified with reference to the data associated with cloud client 105-a. In other words, the cloud clients 105 may share data. Such data may be referred to as second party or 2p data because it is collected by a same data management platform (DMP). In some cases, lookalike identifiers are identified data sources external to the cloud platform 115 (e.g., from an external party or data management platform). Such data may be referred to as 3p data.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

As an example use of the system 100, a cloud client 105 may have a data set of users, customers, potential customers, etc. The cloud client 105 may use the data set to track sales, advertising, etc. In some cases, the cloud client 105 conducts a marketing campaign to a subset of the users of the data set. The subset of the users may be a base segment of the user identifiers according to the system 100. The cloud client 105 wants to expand the advertising to users that are related to the subset of users but may not share an important distinguishing attribute. Accordingly, the system 100 analyzes the data as described herein to identify other users that are related to the segment of users. The cloud client 105 may direct the expanded advertising campaign to the additional identified users.

Figure 2:
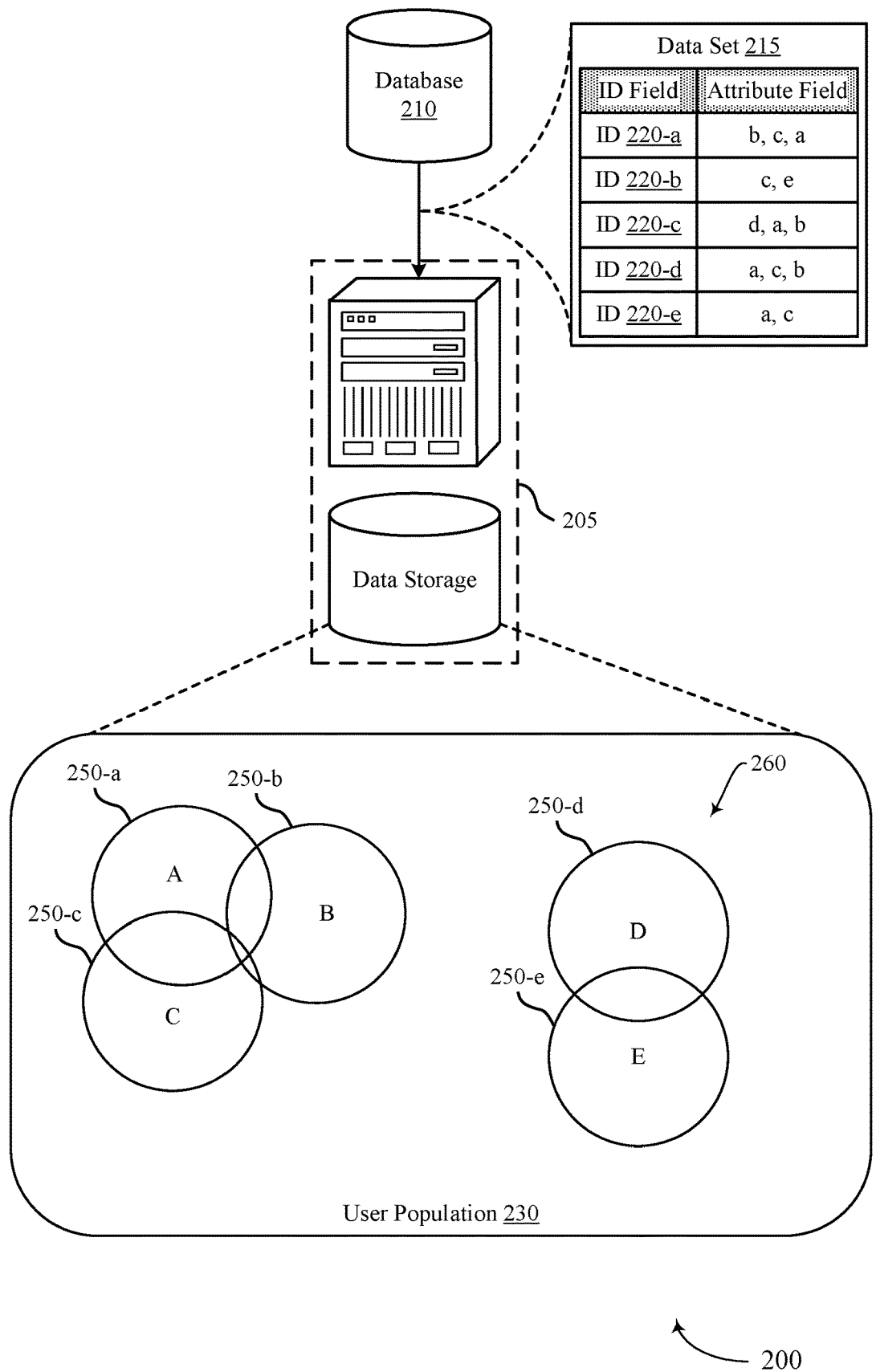
FIG. 2 illustrates an example of a database system that supports identifying user lookalikes in accordance with aspects of the present disclosure.

FIG. 2 illustrates an example of a database system 200 that supports identifying user lookalikes in accordance with aspects of the present disclosure. The database system 200 may be an example of a data center 120 as described with reference to FIG. 1, and may include a database 210 and a data processing machine 205. In some cases, the database 210 may be an example of a transactional database, a time-series database, a multi-tenant database, or some combination of these or other types of databases. The data processing machine 205 may be an example of a database server, an application server, a server cluster, a virtual machine, a container, or some combination of these or other hardware or software components supporting data processing for the database system 200. The data processing machine 205 may include a processing component and a local data storage component, where the local data storage component supports the memory resources of the data processing machine 205 and may be an example of a magnetic tape, magnetic disk, optical disc, flash memory, main memory (e.g., random-access memory (RAM)), memory cache, cloud storage system, or a combination thereof. The data processing machine 205 may perform a lookalike identification procedure on a data set 215 (e.g., based on a user input command, or automatically based on a configuration of the database system 200 or a supported lookalike-based application).

The data processing machine 205 may receive a data set 215 for processing. For example, the database 210 may transmit the data set 215 to the data processing machine 205 for lookalike identification analysis. The data set 215 may include multiple data objects, where each data object includes a user identifier (ID) 220 and a set of data attributes. The data set 215 may include all data objects in the database 210, or may include data objects associated with a certain tenant (e.g., if the database 210 is a multi-tenant database), with a certain time period (e.g., if the attributes are associated with events or activities with corresponding timestamps), or with some other subset of data objects based on a user input value. For example, in some cases, a user operating a user device may select one or more parameters for the data set 215, and the user device may transmit the parameters to the database 210 (e.g., via a database or application server). The database 210 may transmit the data set 215 to the data processing machine 205 based on the received user input.

Each data object in the data set 215 may be identified based on a user identifier 220, and may be associated with one or more data attribute records. These data attribute records may be unique to that data object, or may be common across multiple data objects. In some cases, a user identifier 220 may be an example of a text string unique to that data object. For example, if the data objects correspond to users in the database system 200, the user identifier 220 may be user identification numbers, usernames, social security numbers, device identification, or some other similar form of ID where each value is unique to a user. The data attribute records may be examples of activities performed by a data object (e.g., a user) or characteristics of the data object. For example, the data attribute records may include information related to user devices operated by a user (e.g., internet protocol (IP) addresses, a total number of devices operated, etc.), information related to activities performed by the user while operating one of the user devices (e.g., web search histories, software application information, email communications, consumer data (purchases), etc.), information related specifically to the user (e.g., information from a user profile, values or scores associated with the user, etc.), or a combination thereof. As illustrated in FIG. 2, these different data attribute records may be represented by different letters (e.g., attribute records {a}, {b}, {c}, {d}, and {e}).

In the exemplary case illustrated, the data set 215 may include five data objects. The first data object with user identifier 220-a may include data attribute records {b, c, a}, the second data object with user identifier 220-b may include data attribute records {c, e}, the third data object with user identifier 220-c may include data attribute records {d, a, b}, the fourth data object with user identifier 220-d may include data attribute records {a, c, b}, and the fifth data object with user identifier 220-e may include data attribute records {a, c}. In one example, each data object may correspond to a different user or user device, and each data attribute record may correspond to an activity or activity parameter performed by the user or user device. For example, attribute record {a} may correspond to a user making a particular purchase online, while attribute record {b} may correspond to a user visiting a particular website in a web browser of a user device. These data attribute records may be binary values (e.g., Booleans) related to characteristics of a user.

The data processing machine 205 may receive the data set 215 and classify the user identifiers 220 into one or more segments 250 of user identifiers. The segments 250 are a portion of a visual representation 260 of a user model separated using classification techniques. The classification may be based on the attribute records included with the data object. The segments may correspond to different records. For example, the segment 250-a includes user identifiers 220 that are associated with the attribute record {a}. Accordingly, the segment 250-a includes user identifiers 220-a, 220-c, 220-d, and 220-e, because each of the user identifiers is associated with the attribute record {a}. It should be understood that the data processing machine 205 may classify user identifiers 220 into segments according to more than one attribute record. For example, a particular segment may include the user identifiers 220 associated with attribute records {a} and {c}. Furthermore, the database system 200 may infer some attributes that are associated with user identifiers 220. For example, a user that has purchased a ticket to a sporting event and purchased a team jersey in the last six months may be attributed with a "sports fan" attribute record. These inferred attributes may be utilized to categorize user identifiers 220. User identifiers 220 may be members of zero, one, or many different segments as categorized by the data processing machine 205 based on attributes.

The data processing machine 205, using an LDA approach, calculates measures of importance for each attribute record relative to membership in many of the segments. For example, each of the user identifiers 220 that is a member of the segment 250-*a* may have other identifiers that are common or semi-common between the user identifiers 220. As illustrated, three of the four user identifiers of segment 250-*a* (e.g., identifiers 220 that are associated with the attribute record {a}) are also associated with attribute record {c}. Thus, a user identifier 220 that is associated with attribute record {c} may have a high probability of being classified in the segment 250-*a*. The data processing machine also considers whether the lack of an attribute record signals membership in a segment 250 (e.g., an absence perspective). For example, the members of the segment 250-*a* are not associated with the attribute record {e}. Thus, the data processing machine may determine that a user identifier 220 not being associated with the attribute record {e} is highly probably of being classified in the segment 250-*a*.

As part of the LDA approach, the data processing machine 205 also considers the number of attribute records for user identifiers 220 in a particular segment relative to the number of attribute records in a user population 230 of user identifiers (e.g., degrees of overlaps). For example, if 50% of the user identifiers of the segment 250-*a* are associated with the attribute record {e}, but 50% of the user population 230 is associated with the attribute record {e}, then the attribute record {e} is not a strong signal for membership in the user segment 250-*a*. Further, if a particular attribute record is associated many identifiers 220 of many segments, the attribute record may not signal membership in any particular segment 250. Similarly, an attribute record that is associated with user identifiers 220 that are members in few segments 250, then the attribute record may be a signal of membership in those segments 250. Such calculations may be performed for many different segments 250 and many different attribute records relative to the segments 250.

The data processing machine 205 further determines an average of degrees of overlaps between the attribute records of the user population 230 and the attribute records associated with the segments. Based on the average degree of overlap and one or more correlation parameters, the data processing machine 205 generates a correlation factor. In some cases, the one or more correlation parameters are client specific and determined based on a regression analysis. In some cases, for each segment in the user population 230, an average overlaps with other segments is approximated, and an estimated optimal correlation factors is approximated. The regression analysis identifies a linear relationship between the average overlaps and the optimal correlation factor. The optimal correlation factor is alpha+beta times base segment correlation (e.g., Cf=alpha+ beta*(base segment correlation)). The regression analysis identifies alpha and beta such that the most optimal correlation factor across the segments is recognized. Based on the generated correlation factor, the data processing machine 205 adjusts the calculated measures of importance. Accordingly, the model of user identifiers 220 as classified in one or more segments 250 are adjusted based on correlated parameters.

Using the adjusted model, the data processing machine 205 identifies lookalike user identifiers 220. In some cases, the lookalike identifiers are identified relative to a base segment and identified using the adjusted measures of importance. For example, the data processing machine 205 identifies user identifiers 220 relative to a base segment 250-*a*. A user identifier 220 that is identified as a lookalike user identifier 220 relative to the base segment 250-*a* does not have attribute {a} (e.g., because then it would be a member of the segment 250-*a*) but shares some common attributes with user identifiers of the segment 250-*a*. Accordingly, the data processing machine 205 may identify the user identifiers of 250-*b* as "looking like" the segment 250-*a* based on similarities between attributes. Similarly, the data processing machine 205 may identify segments 250-*d* and 250-*e* as being similar enough as having "lookalike" identifiers. The similarity condition may be based on a threshold level of similarity between segments.

Figure 3:
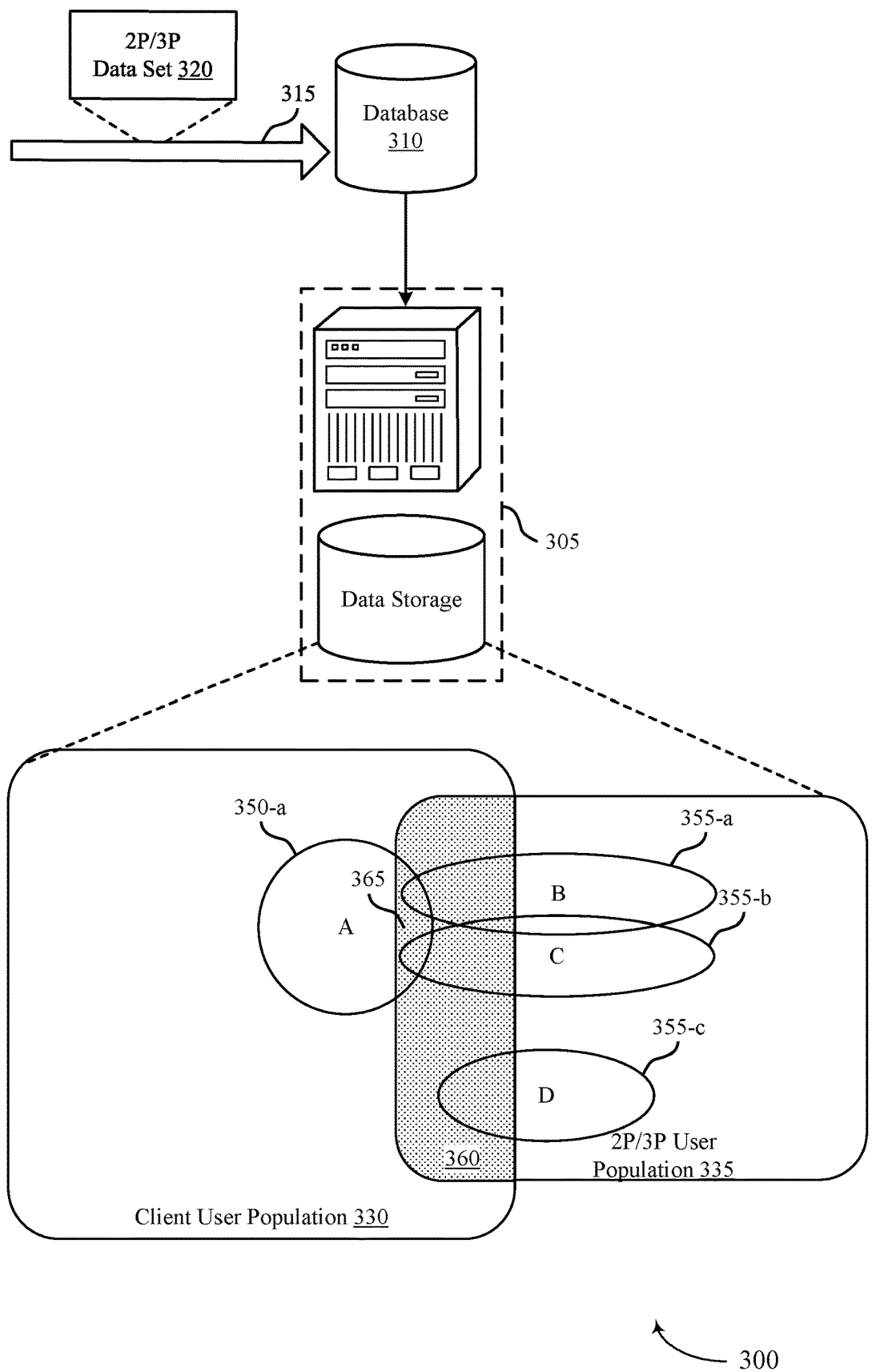
FIG. 3 illustrates an example of a database system that supports identifying user lookalikes in accordance with aspects of the present disclosure

FIG. 3 illustrates an example of a database system 300 that supports identifying user lookalikes in accordance with aspects of the present disclosure. The database system 300 may be an example of a data center 120 or a database system 200 as described with reference to FIGS. 1 and 2 and may include a database 310 and a data processing machine 305. The data processing machine may be an example of the data processing machine 205 as described with reference to FIG. 2. The data processing machine 305 receives and/or retrieves a data set corresponding to a client user population 330, classifies user identifiers, calculates measures of importance of attributes, auto-correlates the attributes, and may identify lookalike user identifiers in the client user population 330 according to aspects described herein.

In FIG. 3, the database 310 and/or the data processing machine 305 receives a 2p or 3p data set 320 via a communication link 315. Such data may be referred to as prospecting data. The data set may be received from another client or contact (e.g., a contact 110 of FIG. 1). For example, a contact associated with a car manufacturer may have an existing data set (e.g., the data set corresponding to the client user population 330) corresponding to users in which one or more marketing plans are directed. The client user population 330 may have attributes corresponding to purchases of cars, web-browsing related to cars, etc. The car manufacturer contact 110 may want to expand its advertising plan to other users outside the client user population 330. Accordingly, the car manufacturer may receive the data set 320 from another client 105. As an example, the car manufacturer is a luxury car manufacturer and retrieves the data set 320 from a business newspaper or magazine. The data set 320 may include data corresponding to new attributes for existing user identifiers (e.g., 2p data) and/or data corresponding to new attributes and new users (3p data).

In some cases, the new data set 320 has been previously processed according to implementations described herein, and in other cases, the data processing machine 305 processes the data set to classify user identifiers, perform LDA, etc. relative to a 2p/3p user population 335. Relative to the 2p/3p user population, the 335, the data processing machine 305 has generated segments 355 of user identifiers. In calculating the measure of importance of the new attributes of the received data set 320, the data processing machine 305 uses the overlap 360 of the client user population 330 and the 2p/3p user population 335 to determine importance of attributes relative to segments and to calculate correlation between attributes. For example, when determining lookalikes between a base segment of the client user population 330 and users of the 2p/3p user population 335, the base segment is limited to the overlap 360 and includes the user identifiers and attributes of the segment portion 365. Furthermore, the user population that is used to perform calculations and identify user lookalikes is limited to the overlap 360. Accordingly, the data processing machine 305 adjusts the "domain" for determining lookalike user identifiers to reflect the commonality between data sets. The data processing machine may identify user identifiers of the segment 355-*a* of the 2p/3p user population 335 as being similar to the user identifiers to the segment portion 365.

In some cases, the database 310 may receive additional or updated attributes for existing user identifiers. For example, a cloud client 105 of FIG. 1 is tracking user behavior of users of a service of the cloud client 105. The user behavior is periodically updated using attributes of the data set based on user behavior logs, for example. The database 310 includes an auto-reach component that monitors the attribute records based on the new or updated data. In some cases, the cloud client 105 may prefer that membership (e.g., by a plurality of user identifiers) remain the same or relatively stable different reasons. If some user behavior data may cause a delta in the user identifiers that satisfies a threshold, the database system may prevent a lookalike segment from being updated. For example, lookalike segment B 350-*a* has a 90% similarity to the base segment 350-*a* and lookalike segment 355-*b* has a 60% similarity to the base segment 350-*a*. If the model is updated for the base segment 350-*a*, the change at the 90% threshold satisfies a reach condition, but the change at the 60% threshold does not. In this case, the users of the lookalike segment 355-*a* may not be updated, but user of the segment 355-*b* may be updated. The threshold may correspond to an auto-reach condition and may be dynamic or selected by a cloud client 105.

Figure 4:
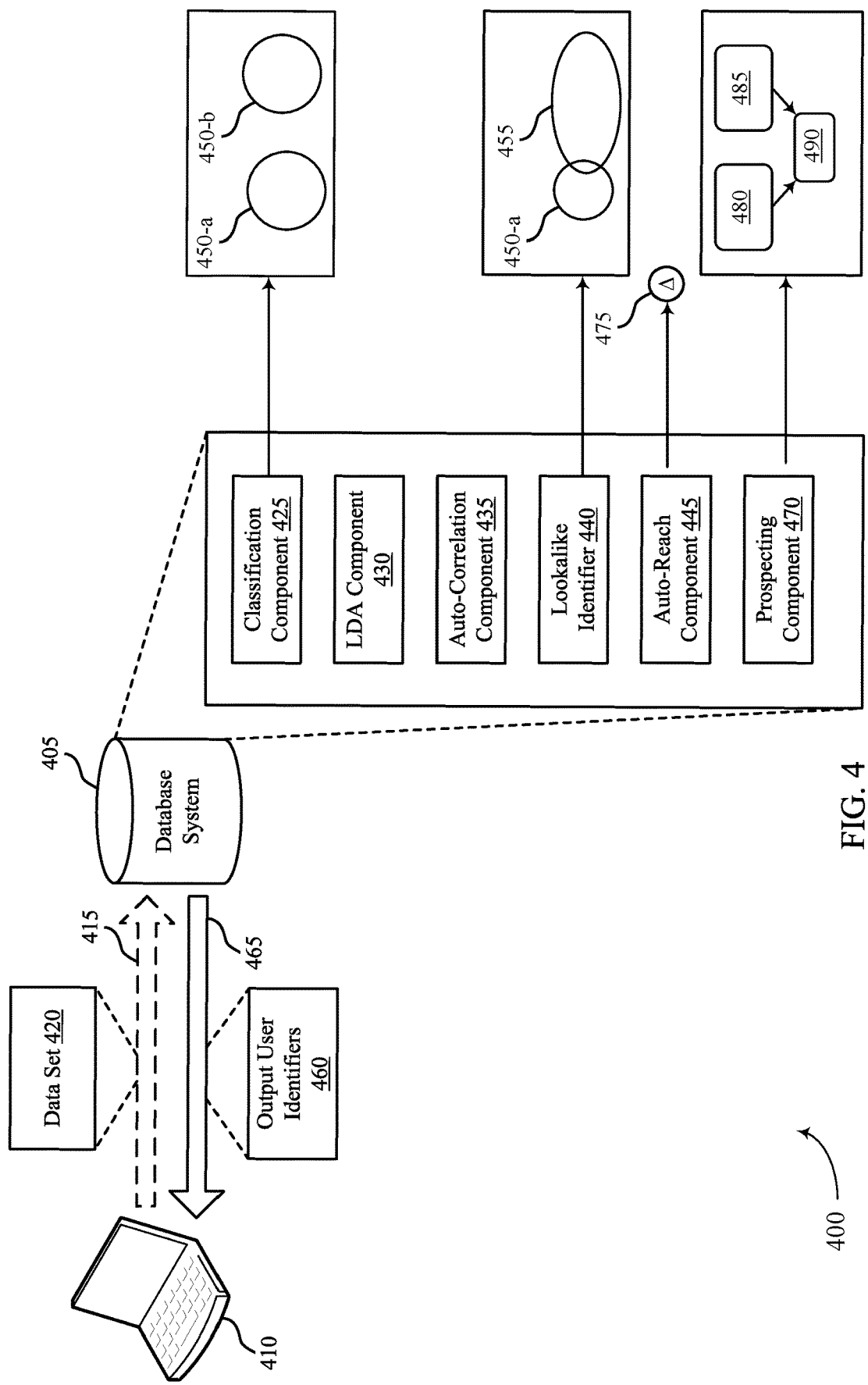
FIG. 4 illustrates an example of a process that supports identifying user lookalikes in accordance with aspects of the present disclosure

FIG. 4 illustrates an example of a process 400 that supports identifying user lookalikes in accordance with aspects of the present disclosure. The process 400 may include a database system 405, which may be an example of a data center 120 or a database system 200 or 400 as described with reference to FIGS. 1-3. In some cases, the database system 405 may interact with a user device 410. The user device 410 may transmit user input signals to the database system 405 for processing on a communication link 415, and the database system 405 may surface output lookalike user identifiers 460 to the user device 410 for processing or display via a communication link 465. In some cases, the database system 405 may receive a data set 420 for lookalike identification from the user device 410. In other cases, the database system 405 may retrieve the data set 420 from a database of the database system 405 (e.g., based on a user input indicating the data set 420, or based on a configuration the database system 405. The database system 405 may implement lookalike identification as described herein to identify relevant lookalike user identifiers 460 using correlated attributes, which are correlated using a processor efficient method. Also, because the attributes are correlated, the database system does not waste processing resources on identifying user identifiers that are associated with irrelevant or uncorrelated attributes.

For example, the database system 405 includes a classification component 425 that classifies the user identifiers of the data set into one or more segments 450 based on the attribute records stored in association with the user identifiers. The classification component 425 may be an example of a classification component 620 or 710 of FIGS. 6 and 7. As an example of one type of classification, the segment 450-*a* may include the user identifiers that are associated with an attribute record {a}. The database system 405 may further include an LDA component 430 that calculates levels of importance of one or more attributes relative to segments. For example, the LDA component 430 may determine attributes (other than attribute {a}) that may signal membership of a user identifier in the segment 450-*a*. The LDA component 430 may process attributes from a presence perspective and an absence perspective, as described herein.

The database system 405 may include an auto-correlation component 435 that determines a correlation approximation for attributes of the data set. The auto-correlation component 435 may identify overlaps between attributes of a user population and the one or more segments 450, determine an average of the overlaps, generate a correlation factor, and adjust the calculated measures of importance based on the correlation factor. The auto-correlation component 435 may include examples of the overlap identifier 630, the averaging component 635, the correlation factor generator 640, and the lookalike identifier 650 of FIG. 6.

The database system 405 may also include a lookalike identifier 440 that identifies lookalike user identifiers relative to one or more base segments. For example, the lookalike identifier 440 identifies a set 455 of lookalike identifiers relative to the segment 450. The lookalike identifier 440 may be an example of a lookalike identifier 650 or 740 of FIGS. 6-7. The set 455 of lookalike identifiers may be transmitted to the user device (e.g., for running marketing to the new identifiers) as output user identifiers 460 over a communication link 465.

The database system 405 may also include an auto-reach component 445 that determines whether the delta in a number of user identifiers as members of one or more segments satisfies an auto-reach condition 475. For example, if a client (e.g., a cloud client 105 of FIG. 1) is directing marketing to user identifiers of a base segment, the cloud client 105 prefer that the members of the base segment remain relatively stable, such as to track the progress of a marketing campaign, continue the marketing campaign, etc. If new user attribute data (e.g., attribute record data received based on user behavior with respect to a user device) is received at the database system 405 and an update of the data set will change the number of user identifiers associated with the base segment, the auto-reach component 445 prevents the data set and/or the attribute model from being updated. As an example, a particular user identifier is associated with a sports fan attribute based on visits to websites over a month long period. If the user associated with the user identifier does not visit a sports website in a week, then the user identifier may not satisfy a condition to be associated with the sports fan attribute. Accordingly, the sports fan attribute may be disassociated with the user identifier, which changes the number of user identifiers in the sports fan base segment. If this and similar circumstances occur enough to change the number of user identifiers associated with the sports fan base segment such as to satisfy a threshold, then the auto-reach component 445 will prevent the attribute model from being updated. In some implementations, the auto-reach condition 475 is a static threshold, and in some implementations, the auto-reach component 445 dynamically determines the auto-reach condition 475 based on the number of user identifiers in a user population, the number of user identifiers in a monitored base segment, etc. In some implementations, the client selects the auto-reach condition 475. The auto-reach component may be an example, of an auto-reach component 760 of FIG. 7.

The database system 405 may further include a prospecting component 470 which receives, processes, and models 2p and/or 3p data. The prospecting component 470 may include a domain adjustment engine 750 of FIG. 7. The prospecting component 470 may receive additional data (e.g., from the user device 410 or from another source) and modify a domain for determining attribute importance measurements to provide more accurate lookalike user identifiers and to limit the data set for more efficient processing. For example, a model for a client user population 480 is utilized to identify lookalikes within the client user population 480. An additional 2p/3p user population 480 is received, and the prospecting component 470 generates a modified user population 490 for analyzing attributes and identifying lookalikes. In some cases, the set of lookalike user is identified from the modified user population. 490.

Figure 5:
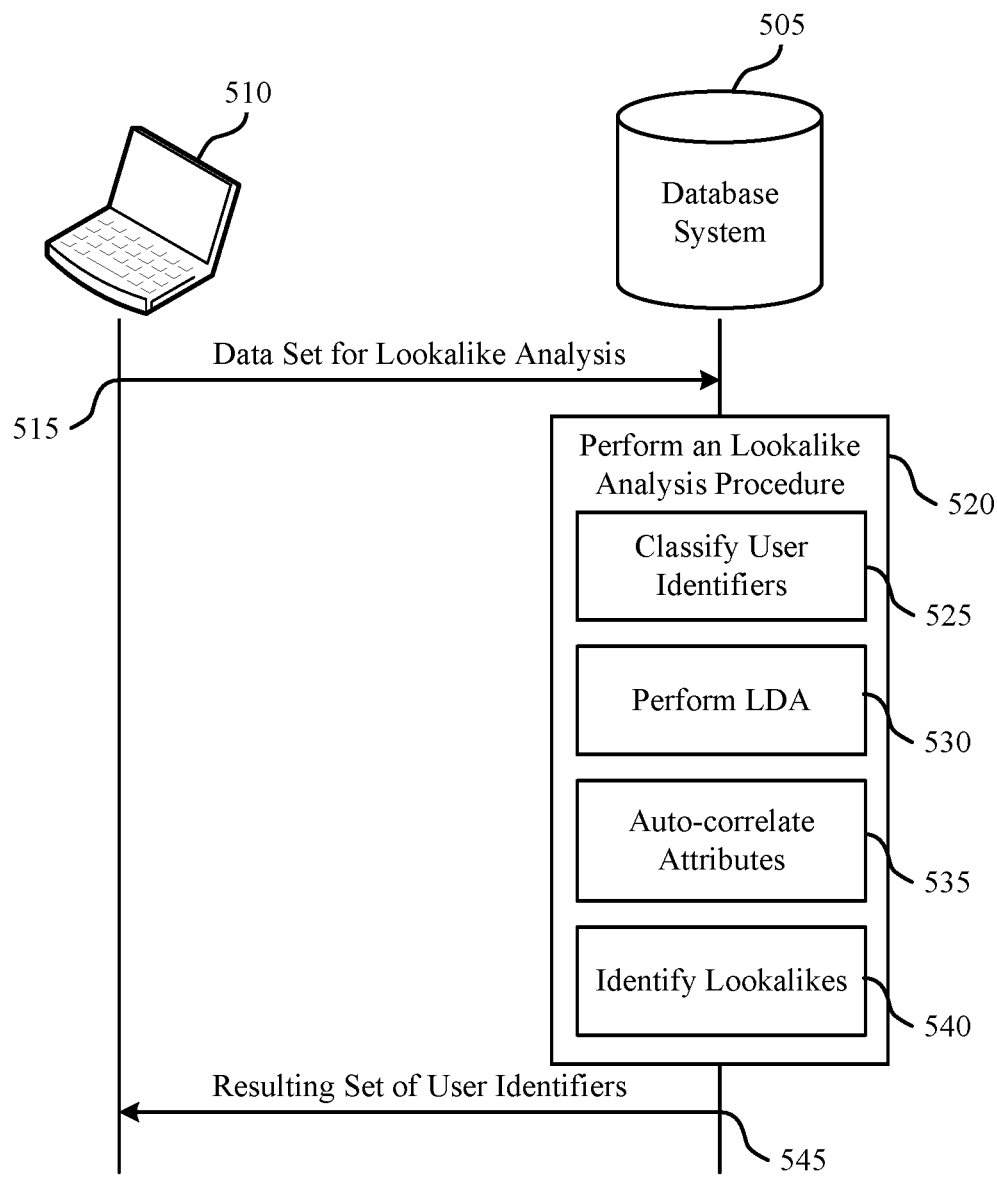
FIG. 5 illustrates an example of a process flow for identifying user lookalikes in a database system in accordance with aspects of the present disclosure.

FIG. 5 illustrates an example of a process flow 500 for identifying user lookalikes in a database system in accordance with aspects of the present disclosure. The process flow 500 may include a database system 505 and a user device 510, which may be examples of the corresponding devices described with reference to FIGS. 1 through 4.

At 515, the database system 505 may receive a data set for lookalike analysis. For example, the database system 505 may determine the data set for analysis based on receiving a lookalike analysis request from the user device 510. In other cases, the database system 505 may retrieve the data set from a database (e.g., based on an event trigger or a configuration of the database system 505), where the data set contains data associated with a certain time period, a certain tenant, or some other set or subset of data. This data set may contain multiple data objects, where each data object includes a number of data attributes. Each data object may additionally include user identifier. In some cases, the data objects may correspond to users or user devices, and the data attributes may correspond to activities performed by the users or user devices, parameters of activities performed by the users or user devices, or characteristics of the users or user devices.

At 520, the database system 505 (e.g., one or more data processing machines supporting the database system 505) may perform a lookalike analysis procedure on the data set received at 515. At 525, the database system 505 may classify a plurality of user identifiers of the data set into one or more segments of user identifiers based on attribute records associated with the user identifiers. Each segment may be associated with one or more attributes. The user identifiers of the data set are members of a user population, which may be associated with a cloud client (e.g., the cloud client 105 of FIG. 1).

At 530, the database system 505 may perform an LDA procedure to calculate measures of importance of attributes relative to membership by user identifiers in the one or more segments. The calculation is based at least in part on a number of user identifiers in the one or more segments associated with a particular attribute record relative to a number of user identifiers in the user population being stored in association with the particular attribute record. In some cases, the LDA procedure considers attribute importance from a presence perspective and an absence prospective, as described herein.

At 535, the database system 505 may auto-correlate attributes relative to one or more segments. Auto-correlation may include identifying degrees of overlaps between each of the attribute records and each of the one or more segments. Auto-correlation may further include determining an average of the degrees of overlaps between the attribute records, generating a correlation factor based on the average degrees of overlaps, and adjusting the measures of importance for each of the attribute record relative to the one or more segments based on the correlation factor. In some cases, the correlation factor is further calculated based on correlation parameters, which are generated based on a regression analysis.

At 540, the database system 505 may identify a set of user identifiers that satisfy a similarity condition relative to the one or more segments. The set of user identifiers is identified based on the attribute records associated with the set of user identifiers and the attribute records associated with the user identifiers that are classified in the one or more segments. The identification uses the measures of importance for each of the attribute records relative to the one or more segments. In some cases, the set of user identifiers are identified relative to a base segment of the one or more segments. In some cases, the base segment is selected by a cloud client. In some cases, the database system 505 generates similarity scores for each of the user identifiers relative to one or more segments (e.g., a base segment), and the selected set of user identifiers satisfy a similarity score threshold.

At 545, the database system 505 may transmit an indication of the resulting set of user identifiers following the lookalike identification procedure. The resulting set is used by the user device 510 for performing marketing campaigns, for example.

Figure 6:
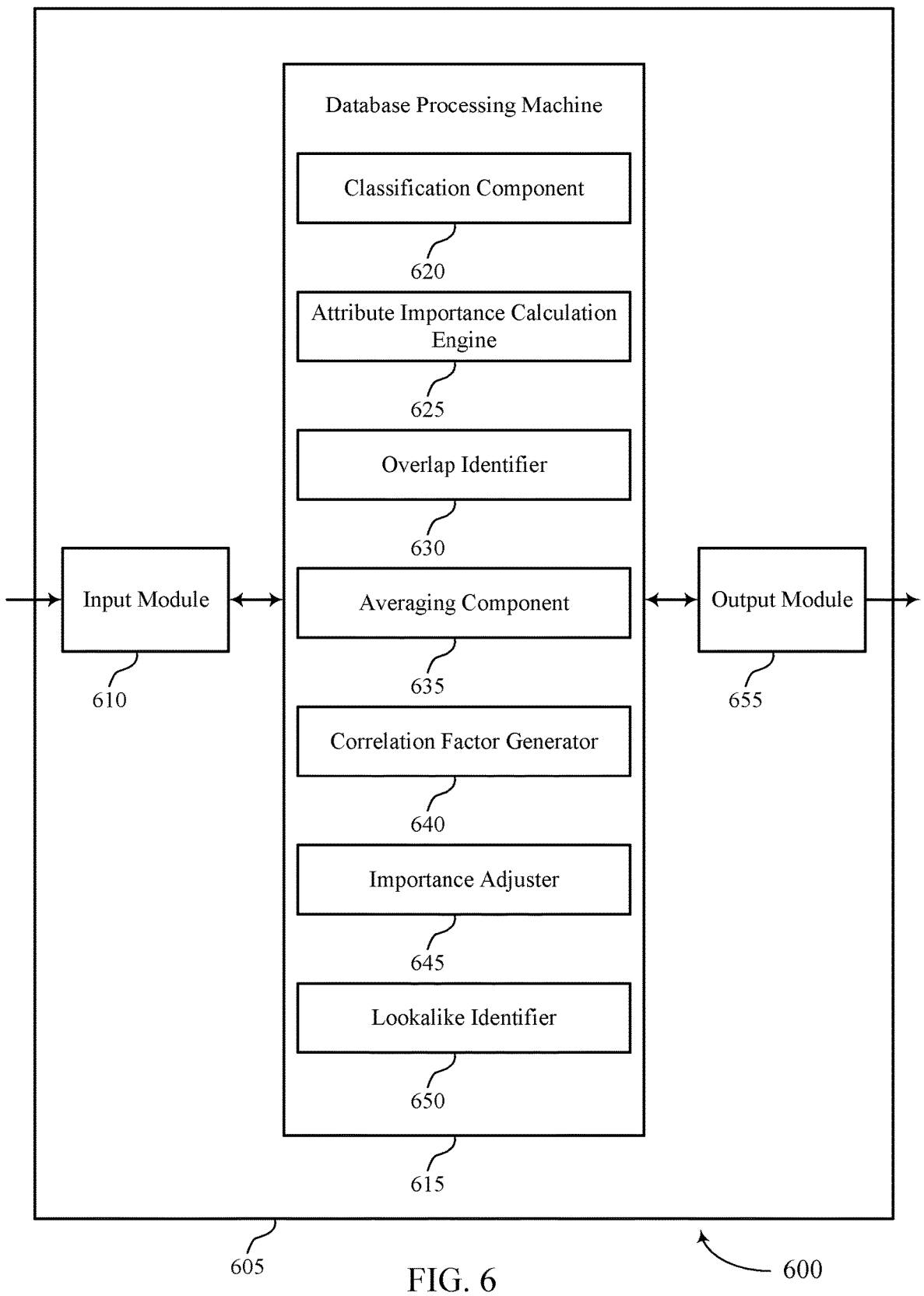
FIG. 6 shows a block diagram of an apparatus that supports identifying user lookalikes in a database system in accordance with aspects of the present disclosure.

FIG. 6 shows a block diagram 600 of an apparatus 605 that supports identifying user lookalikes in a database system in accordance with aspects of the present disclosure. The apparatus 605 may include an input module 610, a database processing machine 615, and an output module 655. The apparatus 605 may also include a processor. Each of these components may be in communication with one another (e.g., via one or more buses). In some cases, the apparatus 605 may be an example of a user terminal, a database server, or a system containing multiple computing devices.

The database processing machine 615 may include a classification component 620, an attribute importance calculation engine 625, an overlap identifier 630, an averaging component 635, a correlation factor generator 640, an importance adjuster 645, and a lookalike identifier 650. The database processing machine 615 may be an example of aspects of the database processing machine 705 or 810 described with reference to FIGS. 7 and 8.

The database processing machine 615 and/or at least some of its various sub-components may be implemented in hardware, software executed by a processor, firmware, or any combination thereof. If implemented in software executed by a processor, the functions of the database processing machine 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The database processing machine 615 and/or at least some of its various sub-components may be physically located at various positions, including being distributed such that portions of functions are implemented at different physical locations by one or more physical devices. In some examples, the database processing machine 615 and/or at least some of its various sub-components may be a separate and distinct component in accordance with various aspects of the present disclosure. In other examples, the database processing machine 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The classification component 620 may classify a set of user identifiers into one or more segments based on attribute records stored in a database in association with the plurality of user identifiers, the set of user identifiers being members of a user population.

The attribute importance calculation engine 625 may calculate measures of importance for each of the attribute records relative to classification in the one or more segments by the set of user identifiers, the calculation being based on a number of user identifiers in the one or more segments being stored in the database in association with a particular attribute record relative to a number of user identifiers in the user population being stored in association with the particular attribute record.

The overlap identifier 630 may identify degrees of overlaps between each of the attribute records stored in the database in association with the plurality of user identifiers and each of the one or more segments.

The averaging component 635 may determine an average of the degrees of overlaps between the attribute records associated with the plurality of user identifiers and the one or more segments.

The correlation factor generator 640 may generate a correlation factor based on the average of the degrees of overlaps between the attribute records associated with the plurality of user identifiers and the one or more segments.

The importance adjuster 645 may adjust the measures of importance for each the attribute records relative to the one or more segments based on the correlation factor.

The lookalike identifier 650 may identify a set of user identifiers that satisfy a similarity condition relative to the one or more segments, the set of user identifiers identified based on attribute records associated with the set of user identifiers and the attribute records associated with the plurality of user identifiers that are classified in the one or more segments and using the measure of importance for each of the attribute records.

Figure 7:
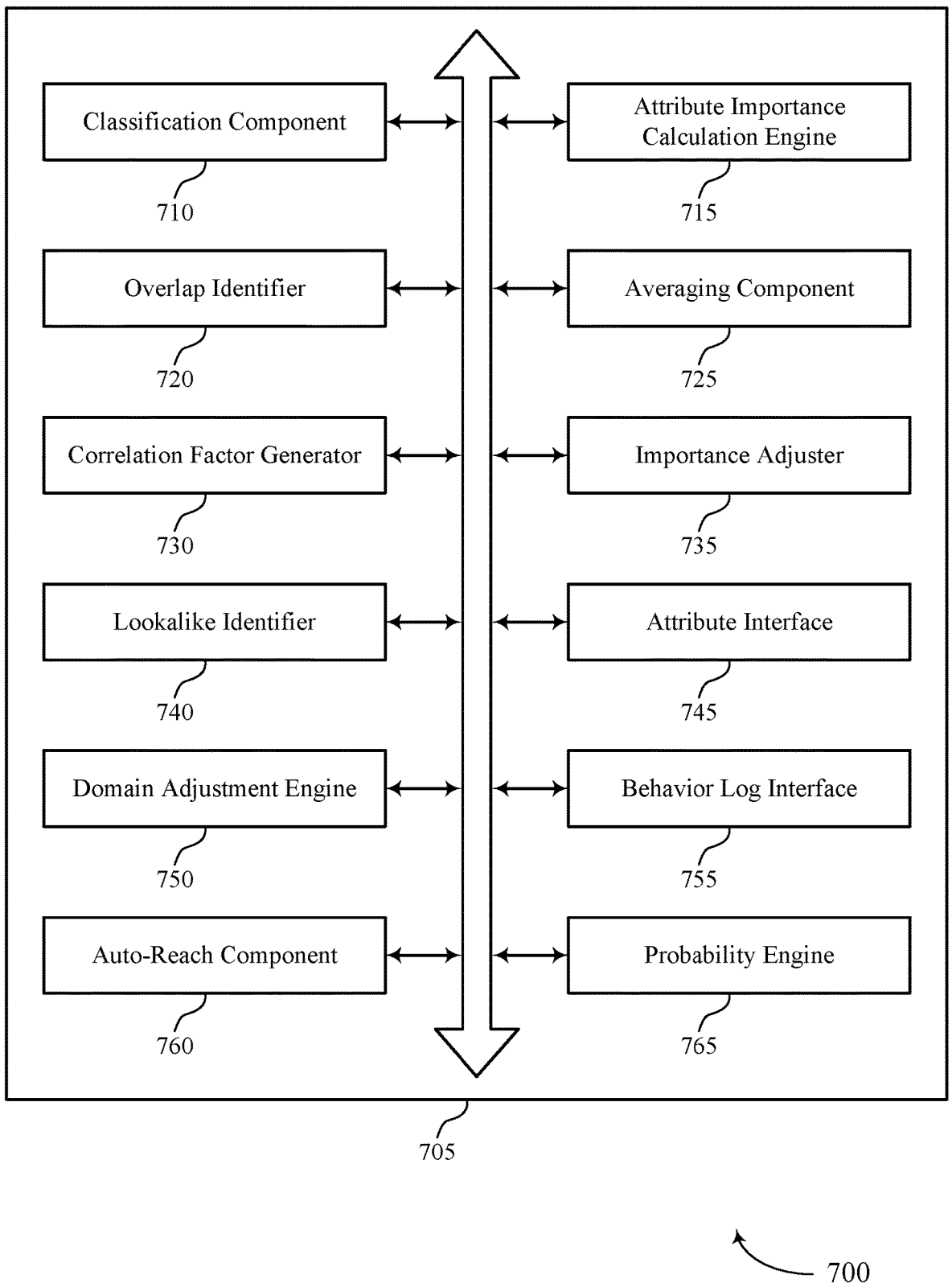
FIG. 7 shows a block diagram of a database processing machine that supports identifying user lookalikes in a database system in accordance with aspects of the present disclosure.

FIG. 7 shows a block diagram 700 of a database processing machine 705 that supports identifying user lookalikes in a database system in accordance with aspects of the present disclosure. The database processing machine 705 may be an example of aspects of a database processing machine 615 or a database processing machine 810 described herein. The database processing machine 705 may include a classification component 710, an attribute importance calculation engine 715, an overlap identifier 720, an averaging component 725, a correlation factor generator 730, an importance adjuster 735, a lookalike identifier 740, an attribute interface 745, a domain adjustment engine 750, a behavior log interface 755, an auto-reach component 760, and a probability engine 765. Each of these modules may communicate, directly or indirectly, with one another (e.g., via one or more buses).

The classification component 710 may classify a set of user identifiers into one or more segments based on attribute records stored in a database in association with the plurality of user identifiers, the set of user identifiers being members of a user population.

The attribute importance calculation engine 715 may calculate measures of importance for each of the attribute records relative to classification in the one or more segments by the set of user identifiers. In some examples, the attribute importance calculation engine 715 may calculate the measure of importance for each of the additional attribute records relative to classification in the one or more segments.

In some examples, the attribute importance calculation engine 715 may calculate the measure of importance for each of the additional attribute records based on a number of user identifiers in the one or more segments being stored in the database in association with a particular attribute record relative to a number of user identifiers in the modified user population being stored in association with the particular attribute record, where the set of user identifiers is identified from the additional user identifiers and the identifying is based on the calculated measure of importance.

The overlap identifier 720 may identify degrees of overlaps between each of the attribute records stored in the database in association with the plurality of user identifiers and each of the one or more segments. The averaging component 725 may determine an average of the degrees of overlaps between the attribute records associated with the plurality of user identifiers and the one or more segments.

The correlation factor generator 730 may generate a correlation factor based on the average of the degrees of overlaps between the attribute records associated with the plurality of user identifiers and the one or more segments. In some examples, the correlation factor generator 730 may select correlation parameters based on a regression analysis. In some examples, the correlation factor generator 730 may calculate the correlation factor using the correlation parameters. The importance adjuster 735 may adjust the measures of importance for each the attribute records relative to the one or more segments based on the correlation factor.

The lookalike identifier 740 may identify a set of user identifiers that satisfy a similarity condition relative to the one or more segments, the set of user identifiers identified based on attribute records associated with the set of user identifiers and the attribute records associated with the plurality of user identifiers that are classified in the one or more segments and using the measure of importance for each of the attribute records.

In some examples, the lookalike identifier 740 may generate similarity scores for each of the plurality of user identifiers relative to one or more base segments of the one or more segments. The attribute interface 745 may receive additional attribute records associated with the plurality of user identifiers. In some examples, the attribute interface 745 may receive additional user identifiers and additional attribute records associated with the additional user identifiers.

The domain adjustment engine 750 may modify the user population based on the additional attribute records associated with the additional user identifiers to generate a modified user population. In some examples, the domain adjustment engine 750 may identify user identifiers that include attribute records overlapping with the additional attribute records associated with the additional user identifiers. In some examples, the domain adjustment engine 750 may select the plurality of user identifiers, as the modified user population, that include the attribute records overlapping with the attribute records associated with the additional user identifiers.

The behavior log interface 755 may receive additional attribute records associated with one or more of the set of user identifiers. The auto-reach component 760 may modify the attribute records stored in the database in association with the plurality of user identifiers based on the additional attribute records responsive to determining that a delta in the number of user identifiers associated with the one or more segments does not satisfy a reach condition. In some examples, the auto-reach component 760 may prevent modification of the attribute records responsive to determining that that the delta in the number of user identifiers associated with the one or more segments satisfies the reach condition.

The probability engine 765 may determine a probability of a particular user identifier being classified in the one or more segments based on the particular user identifier not having a particular attribute record stored in association with the particular user identifier. In some examples, the probability engine 765 may determine a probability of a particular user identifier being classified in the one or more segments based on the particular user identifier having a particular attribute record stored in association with the particular user identifier.

Figure 8:
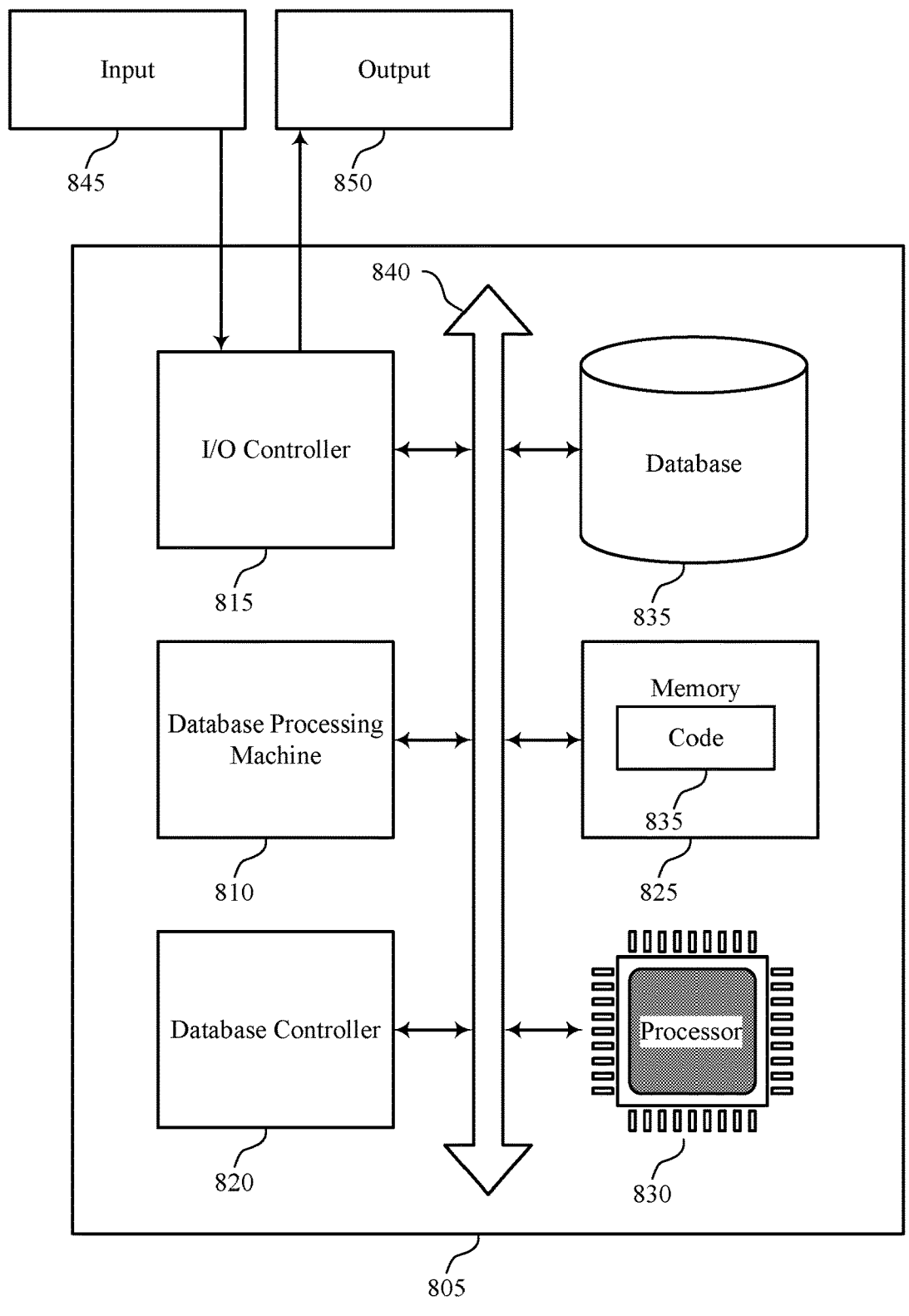
FIG. 8 shows a diagram of a system including a device that supports identifying user lookalikes in a database system in accordance with aspects of the present disclosure.

FIG. 8 shows a diagram of a system 800 including a device 805 that supports identifying user lookalikes in a database system in accordance with aspects of the present disclosure. The device 805 may be an example of or include the components of a data store or an apparatus 605 as described herein. The device 805 may include components for bi-directional data communications including components for transmitting and receiving communications, including a database processing machine 810, an I/O controller 815, a database controller 820, memory 825, a processor 830, and a database 835. These components may be in electronic communication via one or more buses (e.g., bus 840).

The database processing machine 810 may be an example of a database processing machine 615 or 705 as described herein. For example, the database processing machine 810 may perform any of the methods or processes described herein with reference to FIGS. 6 and 7. In some cases, the database processing machine 810 may be implemented in hardware, software executed by a processor, firmware, or any combination thereof.

I/O controller 815 may manage input 845 and output 850 signals for device 805. I/O controller 815 may also manage peripherals not integrated into device 805. In some cases, I/O controller 815 may represent a physical connection or port to an external peripheral. In some cases, I/O controller 815 may utilize an operating system such as iOS®, ANDROID®, MS-DOS®, MS-WINDOWS®, OS/2®, UNIX®, LINUX®, or another known operating system. In other cases, I/O controller 815 may represent or interact with a modem, a keyboard, a mouse, a touchscreen, or a similar device. In some cases, I/O controller 815 may be implemented as part of a processor. In some cases, a user may interact with device 805 via I/O controller 815 or via hardware components controlled by I/O controller 815.

Database Controller 820 may manage data storage and processing in database 835. In some cases, a user may interact with database controller 820. In other cases, database controller 820 may operate automatically without user interaction. Database 835 may be an example of a single database, a distributed database, multiple distributed databases, or an emergency backup database.

Memory 825 may include RAM and ROM. The memory 825 may store computer-readable, computer-executable software 825 (e.g., code) including instructions that, when executed, cause the processor to perform various functions described herein. In some cases, the memory 825 may contain, among other things, a basic input/output system (BIOS) which may control basic hardware or software operation such as the interaction with peripheral components or devices.

Processor 830 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 830 may be configured to operate a memory array using a memory controller. In other cases, a memory controller may be integrated into processor 830. Processor 830 may be configured to execute computer-readable instructions stored in a memory to perform various functions (e.g., functions or tasks supporting identifying user lookalikes in a database system).

Database 835 may be an example of a single database, a distributed database, multiple distributed databases, or an emergency backup database.

Figure 9:
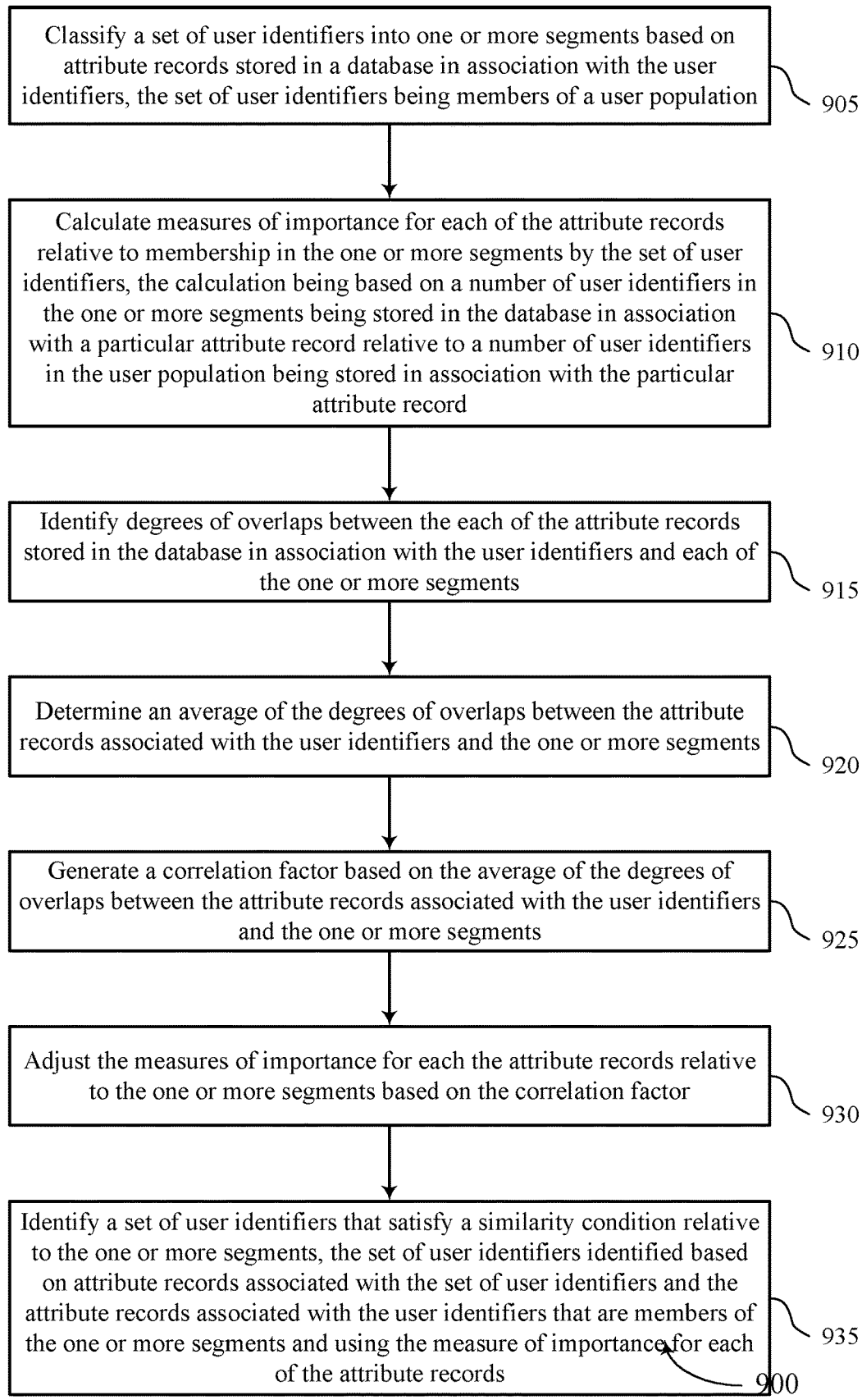
FIGS. 9 through 12 show flowcharts illustrating methods that support identifying user lookalikes in a database system in accordance with aspects of the present disclosure.

FIG. 9 shows a flowchart illustrating a method 900 that supports identifying user lookalikes in a database system in accordance with aspects of the present disclosure. The operations of method 900 may be implemented by a data store or its components as described herein. For example, the operations of method 900 may be performed by a database processing machine as described with reference to FIGS. 6 through 8. In some examples, a data store may execute a set of instructions to control the functional elements of the data store to perform the functions described herein. Additionally or alternatively, a data store may perform aspects of the functions described herein using special-purpose hardware.

At 905, the data store may classify a set of user identifiers into one or more segments based on attribute records stored in a database in association with the plurality of user identifiers, the set of user identifiers being members of a user population. The operations of 905 may be performed according to the methods described herein. In some examples, aspects of the operations of 905 may be performed by a classification component as described with reference to FIGS. 6 through 8.

At 910, the data store may calculate measures of importance for each of the attribute records relative to classification in the one or more segments by the set of user identifiers, the calculation being based on a number of user identifiers in the one or more segments being stored in the database in association with a particular attribute record relative to a number of user identifiers in the user population being stored in association with the particular attribute record. The operations of 910 may be performed according to the methods described herein. In some examples, aspects of the operations of 910 may be performed by an attribute importance calculation engine as described with reference to FIGS. 6 through 8.

At 915, the data store may identify degrees of overlaps between each of the attribute records stored in the database in association with the plurality of user identifiers and each of the one or more segments. The operations of 915 may be performed according to the methods described herein. In some examples, aspects of the operations of 915 may be performed by an overlap identifier as described with reference to FIGS. 6 through 8.

At 920, the data store may determine an average of the degrees of overlaps between the attribute records associated with the plurality of user identifiers and the one or more segments. The operations of 920 may be performed according to the methods described herein. In some examples, aspects of the operations of 920 may be performed by an averaging component as described with reference to FIGS. 6 through 8.

At 925, the data store may generate a correlation factor based on the average of the degrees of overlaps between the attribute records associated with the plurality of user identifiers and the one or more segments. The operations of 925 may be performed according to the methods described herein. In some examples, aspects of the operations of 925 may be performed by a correlation factor generator as described with reference to FIGS. 6 through 8.

At 930, the data store may adjust the measures of importance for each the attribute records relative to the one or more segments based on the correlation factor. The operations of 930 may be performed according to the methods described herein. In some examples, aspects of the operations of 930 may be performed by an importance adjuster as described with reference to FIGS. 6 through 8.

At 935, the data store may identify a set of user identifiers that satisfy a similarity condition relative to the one or more segments, the set of user identifiers identified based on attribute records associated with the set of user identifiers and the attribute records associated with the plurality of user identifiers that are classified in the one or more segments and using the measure of importance for each of the attribute records. In some cases, the set of user identifiers are identified relative to a base segment. In some cases, a similarity score for each of the plurality of user identifiers is generated, and the selected set of user identifiers is based on the similarity scores satisfying a similarity condition. The operations of 935 may be performed according to the methods described herein. In some examples, aspects of the operations of 935 may be performed by a lookalike identifier as described with reference to FIGS. 6 through 8.

Figure 10:
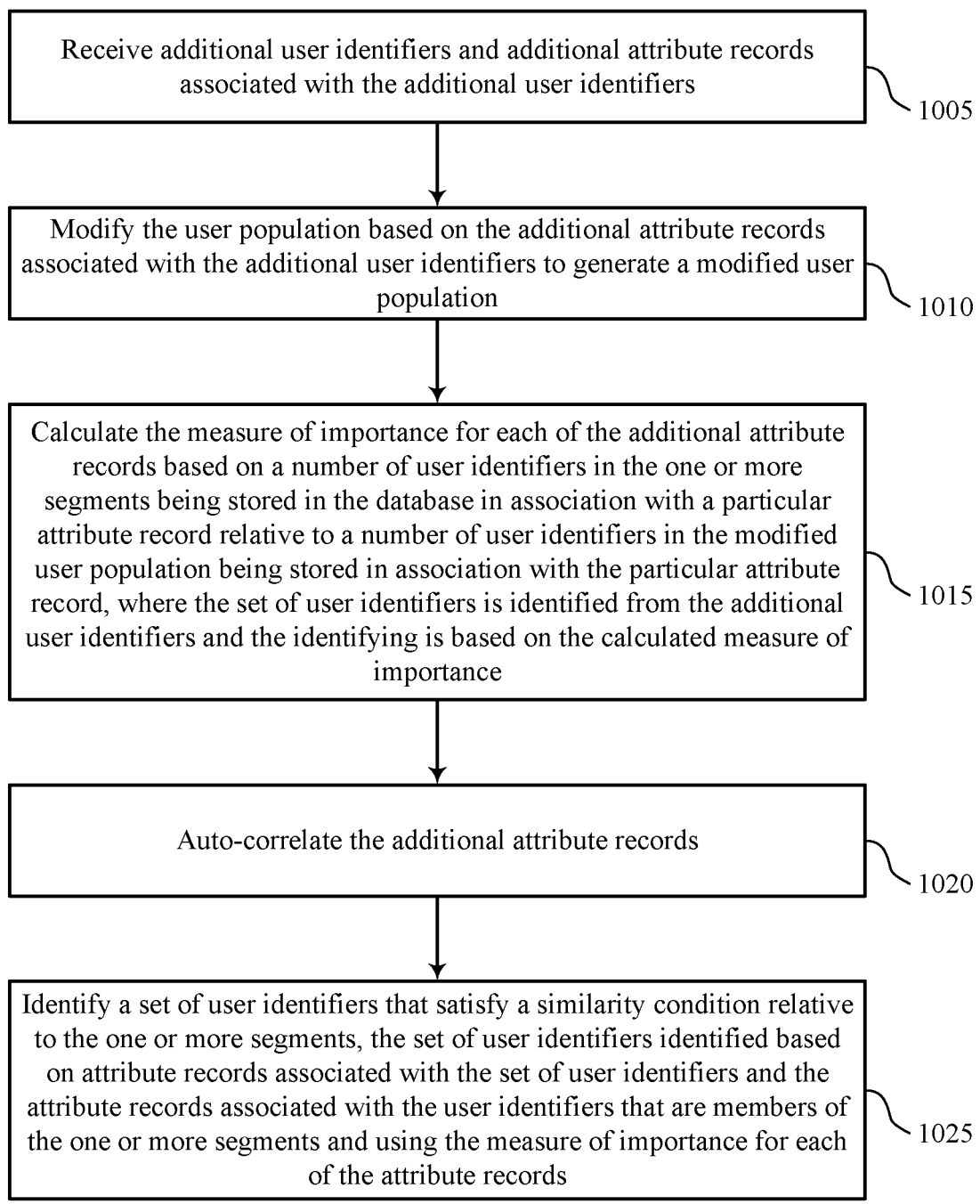

FIG. 10 shows a flowchart illustrating a method 1000 that supports identifying user lookalikes in a database system in accordance with aspects of the present disclosure. The operations of method 1000 may be implemented by a data store or its components as described herein. For example, the operations of method 1000 may be performed by a database processing machine as described with reference to FIGS. 6 through 8. In some examples, a data store may execute a set of instructions to control the functional elements of the data store to perform the functions described herein. Additionally or alternatively, a data store may perform aspects of the functions described herein using special-purpose hardware. The data store may have performed a lookalike identification procedure (as described with reference to FIG. 9) on a client data set.

At 1005, the data store may receive additional user identifiers and additional attribute records associated with the additional user identifiers. The operations of 1005 may be performed according to the methods described herein. In some examples, aspects of the operations of 1005 may be performed by an attribute interface as described with reference to FIGS. 6 through 8.

At 1010, the data store may modify the user population based on the additional attribute records associated with the additional user identifiers to generate a modified user population. The operations of 1010 may be performed according to the methods described herein. In some examples, aspects of the operations of 1010 may be performed by a domain adjustment engine as described with reference to FIGS. 6 through 8.

At 1015, the data store may calculate the measure of importance for each of the additional attribute records based on a number of user identifiers in the one or more segments being stored in the database in association with a particular attribute record relative to a number of user identifiers in the modified user population being stored in association with the particular attribute record, where the set of user identifiers is identified from the additional user identifiers and the identifying is based on the calculated measure of importance. The operations of 1015 may be performed according to the methods described herein. In some examples, aspects of the operations of 1015 may be performed by an attribute importance calculation engine as described with reference to FIGS. 6 through 8.

At 1020, the data store may auto-correlate the additional attribute records. The operations of 1020 may be performed according to the methods described herein. In some examples, aspects of the operations of 1020 may be performed by auto-correlation component 435, an overlap identifier 720, an averaging component 725, a correlation factor generator 730, and importance adjuster 735 as described with reference to FIGS. 4 through 8.

At 1025 the data store may identify a set of user identifiers that satisfy a similarity condition relative to the one or more segments, the set of user identifiers identified based on attribute records associated with the set of user identifiers and the attribute records associated with the plurality of user identifiers that are classified in the one or more segments and using the measure of importance for each of the attribute records. In some cases, the set of user identifiers are identified from the received additional user identifiers. The operations of 1025 may be performed according to the methods described herein. In some examples, aspects of the operations of 1025 may be performed by a lookalike identifier as described with reference to FIGS. 6 through 8.

Figure 11:
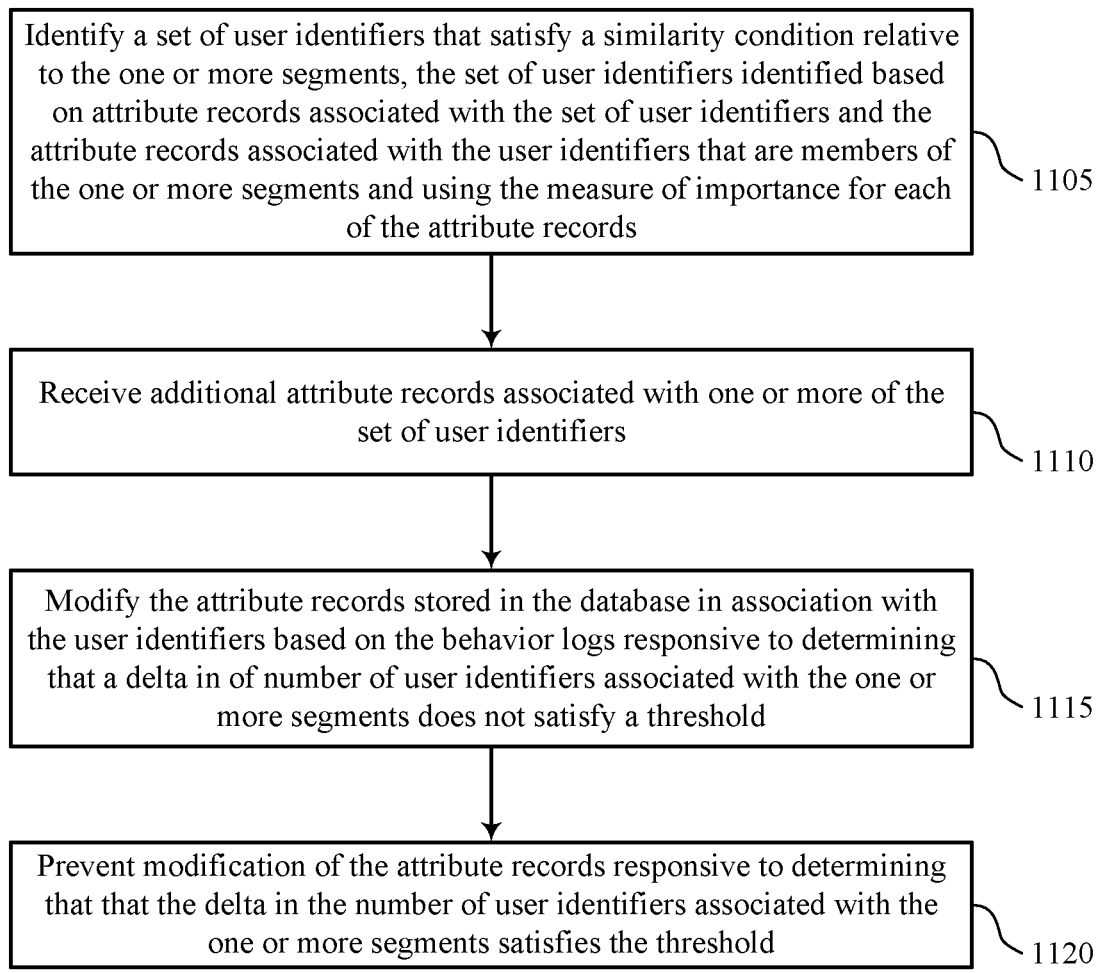

FIG. 11 shows a flowchart illustrating a method 1100 that supports identifying user lookalikes in a database system in accordance with aspects of the present disclosure. The operations of method 1100 may be implemented by a data store or its components as described herein. For example, the operations of method 1100 may be performed by a database processing machine as described with reference to FIGS. 6 through 8. In some examples, a data store may execute a set of instructions to control the functional elements of the data store to perform the functions described herein. Additionally or alternatively, a data store may perform aspects of the functions described herein using special-purpose hardware. The data store may have performed a lookalike identification procedure (as described with reference to FIG. 9) on a client data set or on a client data set and a received data set (as described with reference to FIG. 10)

At 1105, the data store may identify a set of user identifiers that satisfy a similarity condition relative to the one or more segments, the set of user identifiers identified based on attribute records associated with the set of user identifiers and the attribute records associated with the plurality of user identifiers that are classified in the one or more segments and using the measure of importance for each of the attribute records. The operations of 1105 may be performed according to the methods described herein. In some examples, aspects of the operations of 1105 may be performed by a lookalike identifier as described with reference to FIGS. 6 through 8.

At 1110, the data store may receive additional attribute records associated with one or more of the set of user identifiers. The operations of 1110 may be performed according to the methods described herein. In some examples, aspects of the operations of 1110 may be performed by a behavior log interface as described with reference to FIGS. 6 through 8.

At 1115, the data store may modify the attribute records stored in the database in association with the plurality of user identifiers based on the additional attribute records responsive to determining that a delta in the number of user identifiers associated with the one or more segments does not satisfy a reach condition. The operations of 1115 may be performed according to the methods described herein. In some examples, aspects of the operations of 1115 may be performed by an auto-reach component as described with reference to FIGS. 6 through 8.

At 1120, the data store may prevent modification of the attribute records responsive to determining that that the delta in the number of user identifiers associated with the one or more segments satisfies the reach condition. The operations of 1120 may be performed according to the methods described herein. In some examples, aspects of the operations of 1120 may be performed by an auto-reach component as described with reference to FIGS. 6 through 8.

Figure 12:
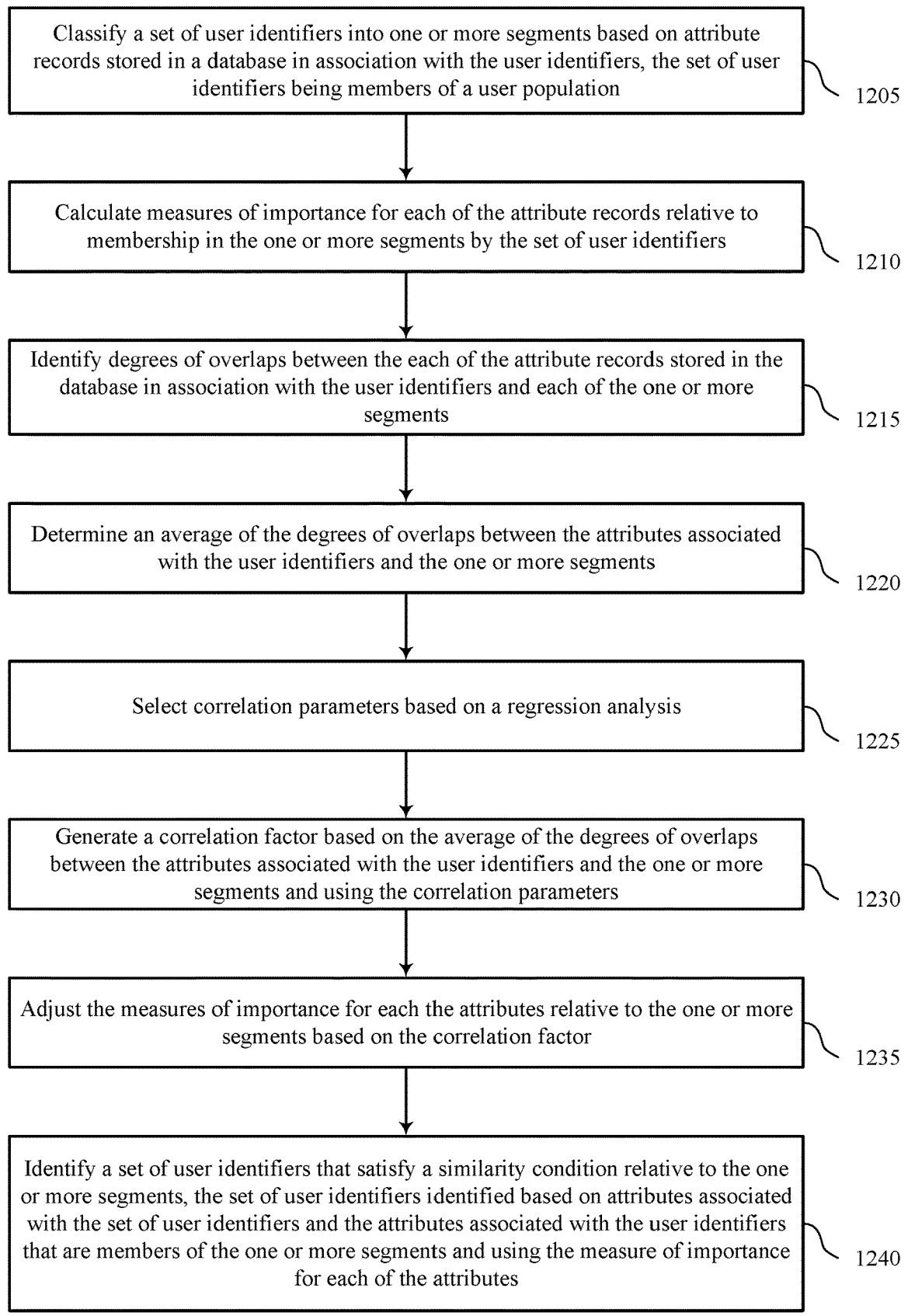

FIG. 12 shows a flowchart illustrating a method 1200 that supports identifying user lookalikes in a database system in accordance with aspects of the present disclosure. The operations of method 1200 may be implemented by a data store or its components as described herein. For example, the operations of method 1200 may be performed by a database processing machine as described with reference to FIGS. 6 through 8. In some examples, a data store may execute a set of instructions to control the functional elements of the data store to perform the functions described herein. Additionally or alternatively, a data store may perform aspects of the functions described herein using special-purpose hardware.

At 1205, the data store may classify a set of user identifiers into one or more segments based on attribute records stored in a database in association with the plurality of user identifiers, the set of user identifiers being members of a user population. The operations of 1205 may be performed according to the methods described herein. In some examples, aspects of the operations of 1205 may be performed by a classification component as described with reference to FIGS. 6 through 8.

At 1210, the data store may calculate measures of importance for each of the attribute records relative to classification in the one or more segments by the set of user identifiers, the calculation being based on a number of user identifiers in the one or more segments being stored in the database in association with a particular attribute record relative to a number of user identifiers in the user population being stored in association with the particular attribute record. The operations of 1210 may be performed according to the methods described herein. In some examples, aspects of the operations of 1210 may be performed by an attribute importance calculation engine as described with reference to FIGS. 6 through 8.

At 1215, the data store may identify degrees of overlaps between each of the attribute records stored in the database in association with the plurality of user identifiers and each of the one or more segments. The operations of 1215 may be performed according to the methods described herein. In some examples, aspects of the operations of 1215 may be performed by an overlap identifier as described with reference to FIGS. 6 through 8.

At 1220, the data store may determine an average of the degrees of overlaps between the attribute records associated with the plurality of user identifiers and the one or more segments. The operations of 1220 may be performed according to the methods described herein. In some examples, aspects of the operations of 1220 may be performed by an averaging component as described with reference to FIGS. 6 through 8.

At 1225, the data store may select correlation parameters based on a regression analysis. The operations of 1225 may be performed according to the methods described herein. In some examples, aspects of the operations of 1225 may be performed by a correlation factor generator as described with reference to FIGS. 6 through 8.

At 1230, the data store may generate a correlation factor based on the average of the degrees of overlaps between the attribute records associated with the plurality of user identifiers and the one or more segments and using the correlation parameters. In some cases, the correlation factor is generated using the average degrees of overlaps and the correlation parameters. The operations of 1230 may be performed according to the methods described herein. In some examples, aspects of the operations of 1230 may be performed by a correlation factor generator as described with reference to FIGS. 6 through 8.

At 1235, the data store may adjust the measures of importance for each the attribute records relative to the one or more segments based on the correlation factor. The operations of 1235 may be performed according to the methods described herein. In some examples, aspects of the operations of 1235 may be performed by an importance adjuster as described with reference to FIGS. 6 through 8.

At 1240, the data store may identify a set of user identifiers that satisfy a similarity condition relative to the one or more segments, the set of user identifiers identified based on attribute records associated with the set of user identifiers and the attribute records associated with the plurality of user identifiers that are classified in the one or more segments and using the measure of importance for each of the attribute records. The operations of 1240 may be performed according to the methods described herein. In some examples, aspects of the operations of 1240 may be performed by a lookalike identifier as described with reference to FIGS. 6 through 8.

A method of database processing is described. The method may include classifying a set of user identifiers into one or more segments based on attribute records stored in a database in association with the plurality of user identifiers, the set of user identifiers being members of a user population, calculating measures of importance for each of the attribute records relative to classification in the one or more segments by the set of user identifiers, the calculation being based on a number of user identifiers in the one or more segments being stored in the database in association with a particular attribute record relative to a number of user identifiers in the user population being stored in association with the particular attribute record, identifying degrees of overlaps between each of the attribute records stored in the database in association with the plurality of user identifiers and each of the one or more segments, determining an average of the degrees of overlaps between the attribute records associated with the plurality of user identifiers and the one or more segments, generating a correlation factor based on the average of the degrees of overlaps between the attribute records associated with the plurality of user identifiers and the one or more segments, adjusting the measures of importance for each the attribute records relative to the one or more segments based on the correlation factor, and identifying a set of user identifiers that satisfy a similarity condition relative to the one or more segments, the set of user identifiers identified based on attribute records associated with the set of user identifiers and the attribute records associated with the plurality of user identifiers that are classified in the one or more segments and using the measure of importance for each of the attribute records.

An apparatus for database processing is described. The apparatus may include a processor, memory in electronic communication with the processor, and instructions stored in the memory. The instructions may be executable by the processor to cause the apparatus to classify a set of user identifiers into one or more segments based on attribute records stored in a database in association with the plurality of user identifiers, the set of user identifiers being members of a user population, calculate measures of importance for each of the attribute records relative to classification in the one or more segments by the set of user identifiers, the calculation being based on a number of user identifiers in the one or more segments being stored in the database in association with a particular attribute record relative to a number of user identifiers in the user population being stored in association with the particular attribute record, identify degrees of overlaps between each of the attribute records stored in the database in association with the plurality of user identifiers and each of the one or more segments, determine an average of the degrees of overlaps between the attribute records associated with the plurality of user identifiers and the one or more segments, generate a correlation factor based on the average of the degrees of overlaps between the attribute records associated with the plurality of user identifiers and the one or more segments, adjust the measures of importance for each the attribute records relative to the one or more segments based on the correlation factor, and identify a set of user identifiers that satisfy a similarity condition relative to the one or more segments, the set of user identifiers identified based on attribute records associated with the set of user identifiers and the attribute records associated with the plurality of user identifiers that are classified in the one or more segments and using the measure of importance for each of the attribute records.

Another apparatus for database processing is described. The apparatus may include means for classifying a set of user identifiers into one or more segments based on attribute records stored in a database in association with the plurality of user identifiers, the set of user identifiers being members of a user population, calculating measures of importance for each of the attribute records relative to classification in the one or more segments by the set of user identifiers, the calculation being based on a number of user identifiers in the one or more segments being stored in the database in association with a particular attribute record relative to a number of user identifiers in the user population being stored in association with the particular attribute record, identifying degrees of overlaps between each of the attribute records stored in the database in association with the plurality of user identifiers and each of the one or more segments, determining an average of the degrees of overlaps between the attribute records associated with the plurality of user identifiers and the one or more segments, generating a correlation factor based on the average of the degrees of overlaps between the attribute records associated with the plurality of user identifiers and the one or more segments, adjusting the measures of importance for each the attribute records relative to the one or more segments based on the correlation factor, and identifying a set of user identifiers that satisfy a similarity condition relative to the one or more segments, the set of user identifiers identified based on attribute records associated with the set of user identifiers and the attribute records associated with the plurality of user identifiers that are classified in the one or more segments and using the measure of importance for each of the attribute records.

A non-transitory computer-readable medium storing code for database processing is described. The code may include instructions executable by a processor to classify a set of user identifiers into one or more segments based on attribute records stored in a database in association with the plurality of user identifiers, the set of user identifiers being members of a user population, calculate measures of importance for each of the attribute records relative to classification in the one or more segments by the set of user identifiers, the calculation being based on a number of user identifiers in the one or more segments being stored in the database in association with a particular attribute record relative to a number of user identifiers in the user population being stored in association with the particular attribute record, identify degrees of overlaps between each of the attribute records stored in the database in association with the plurality of user identifiers and each of the one or more segments, determine an average of the degrees of overlaps between the attribute records associated with the plurality of user identifiers and the one or more segments, generate a correlation factor based on the average of the degrees of overlaps between the attribute records associated with the plurality of user identifiers and the one or more segments, adjust the measures of importance for each the attribute records relative to the one or more segments based on the correlation factor, and identify a set of user identifiers that satisfy a similarity condition relative to the one or more segments, the set of user identifiers identified based on attribute records associated with the set of user identifiers and the attribute records associated with the plurality of user identifiers that are classified in the one or more segments and using the measure of importance for each of the attribute records.

Some examples of the method, apparatuses, and non-transitory computer-readable medium described herein may further include operations, features, means, or instructions for receiving additional attribute records associated with the plurality of user identifiers and calculating the measure of importance for each of the additional attribute records relative to classification in the one or more segments.

Some examples of the method, apparatuses, and non-transitory computer-readable medium described herein may further include operations, features, means, or instructions for receiving additional user identifiers and additional attribute records associated with the additional user identifiers, modifying the user population based on the additional attribute records associated with the additional user identifiers to generate a modified user population and calculating the measure of importance for each of the additional attribute records based on a number of user identifiers in the one or more segments being stored in the database in association with a particular attribute record relative to a number of user identifiers in the modified user population being stored in association with the particular attribute record, where the set of user identifiers may be identified from the additional user identifiers and the identifying may be based on the calculated measure of importance.

In some examples of the method, apparatuses, and non-transitory computer-readable medium described herein, modifying the user population further may include operations, features, means, or instructions for identifying user identifiers that include attribute records overlapping with the additional attribute records associated with the additional user identifiers and selecting the plurality of user identifiers, as the modified user population, that include the attribute records overlapping with the attribute records associated with the additional user identifiers.

In some examples of the method, apparatuses, and non-transitory computer-readable medium described herein, generating the correlation factor further may include operations, features, means, or instructions for selecting correlation parameters based on a regression analysis and calculating the correlation factor using the correlation parameters.

Some examples of the method, apparatuses, and non-transitory computer-readable medium described herein may further include operations, features, means, or instructions for receiving additional attribute records associated with one or more of the set of user identifiers, modifying the attribute records stored in the database in association with the plurality of user identifiers based on the additional attribute records responsive to determining that a delta in the number of user identifiers associated with the one or more segments does not satisfy a reach condition and preventing modification of the attribute records responsive to determining that that the delta in the number of user identifiers associated with the one or more segments satisfies the reach condition.

In some examples of the method, apparatuses, and non-transitory computer-readable medium described herein, calculating the measure of importance for each of the attribute records relative to classification in the one or more segments by the set of user identifiers further may include operations, features, means, or instructions for determining a probability of a particular user identifier being classified in the one or more segments based on the particular user identifier not having a particular attribute record stored in association with the particular user identifier.

In some examples of the method, apparatuses, and non-transitory computer-readable medium described herein, calculating the measure of importance for each of the attribute records relative to classification in the one or more segments by the set of user identifiers further may include operations, features, means, or instructions for determining a probability of a particular user identifier being classified in the one or more segments based on the particular user identifier having a particular attribute record stored in association with the particular user identifier.

In some examples of the method, apparatuses, and non-transitory computer-readable medium described herein, identifying a set of user identifiers that satisfy a similarity condition relative to the one or more segments further may include operations, features, means, or instructions for generating similarity scores for each of the plurality of user identifiers relative to one or more base segments of the one or more segments.

In some examples of the method, apparatuses, and non-transitory computer-readable medium described herein, the set of user identifiers may be identified relative to a base segment, the base segment based on one or more of the attribute records.

In some examples of the method, apparatuses, and non-transitory computer-readable medium described herein, the similarity condition may be selected by a user.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, read only memory (ROM), electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for database processing, comprising:
   classifying a plurality of user identifiers into one or more segments based at least in part on attribute records associated with the plurality of user identifiers, the plurality of user identifiers being members of a user population;
   calculating a measure of importance for each of the attribute records relative to classification in the one or more segments of the plurality of user identifiers, the calculation being based at least in part on a probability that a particular user identifier is classified in each of the one or more segments given that either the particular user identifier is associated with each attribute record or that the particular user identifier is not associated with each attribute record;
   identifying, for a segment of the one or more segments, a degree of overlap for an attribute record with the segment, the degree of overlap based on a number of user identifiers in the segment associated with the attribute record relative to a total number of user identifiers in the user population that are associated with the attribute record;
   performing the identifying for each of the one or more segments and each of the attribute records relative to the one or more segments;
   determining an average of the degree of overlap the one or more segments;
   generating a correlation factor based on the average that reflects a correlation of attribute records in the user population relative to the one or more segments;
   adjusting the measure of importance for each of the attribute records relative to the one or more segments based on the correlation factor; and
   identifying a set of user identifiers that satisfies a similarity condition relative to the one or more segments, the set of user identifiers identified based at least in part on attribute records associated with the set of user identifiers and an adjusted measure of importance for each of the attribute records associated with the set of user identifiers.

2. The method of claim 1, further comprising:
   receiving additional attribute records associated with the plurality of user identifiers; and
   calculating the measure of importance for each of the additional attribute records relative to classification in the one or more segments.

3. The method of claim 1, further comprising:
   receiving additional user identifiers and additional attribute records associated with the additional user identifiers;
   modifying the user population based on using the additional attribute records associated with the additional user identifiers to generate a modified user population; and
   calculating the measure of importance for each of the additional attribute records based at least in part on a probability that a particular additional user identifier is classified in each of the one or more segments given that the particular additional user identifier is associated with each additional attribute record and given that the particular additional user identifier is not associated with each additional attribute record, wherein the set of user identifiers includes additional user identifiers and the identifying is based at least in part on the calculated measure of importance for each of the additional attribute records.

4. The method of claim 3, wherein modifying the user population further comprises:
   identifying user identifiers that are associated with attribute records overlapping with the additional attribute records associated with the additional user identifiers; and
   selecting the user identifiers, as the modified user population, that are associated with the attribute records overlapping with the attribute records associated with the additional user identifiers.

5. The method of claim 1, wherein generating the correlation factor further comprises:
   selecting correlation parameters based on a regression analysis; and
   calculating the correlation factor using the correlation parameters.

6. The method of claim 1, further comprising:
   receiving additional attribute records associated with one or more of the plurality of user identifiers;
   modifying the attribute records associated with the plurality of user identifiers based on the additional attribute records responsive to determining that a delta of a number of user identifiers associated with the one or more segments does not satisfy a reach condition; and
   preventing modification of the attribute records associated with the plurality of user identifiers responsive to determining that that the delta of the number of user identifiers associated with the one or more segments satisfies the reach condition.

7. The method of claim 1, wherein identifying the set of user identifiers that satisfy the similarity condition relative to the one or more segments further comprises:

generating similarity scores for each of the plurality of user identifiers relative to the one or more segments.

8. The method of claim 1, wherein the set of user identifiers are identified relative to a base segment of the one or more segments, the base segment based on one or more of the attribute records in the user population.

9. The method of claim 1, wherein the similarity condition is selected by a user.

10. An apparatus for database processing, comprising:
a processor,
memory in electronic communication with the processor; and
instructions stored in the memory and executable by the processor to cause the apparatus to:
classify a plurality of user identifiers into one or more segments based at least in part on attribute records associated with the plurality of user identifiers, the plurality of user identifiers being members of a user population;
calculate a measure of importance for each of the attribute records relative to classification in the one or more segments of the plurality of user identifiers, the calculation being based at least in part on a probability that a particular user identifier is classified in each of the one or more segments given that either the particular user identifier is associated with each attribute record or that the particular user identifier is not associated with each attribute record;
identify, for a segment of the one or more segments, a degree of overlap for an attribute record with the segment, the degree of overlap based on a number of user identifiers in the segment associated with the attribute record relative to a total number of user identifiers in the user population that are associated with the attribute record;
perform the identifying for each of the one or more segments and each of the attribute records relative to the one or more segments;
determine an average of the degree of overlap the one or more segments;
generate a correlation factor based on the average that reflects a correlation of attribute records in the user population relative to the one or more segments;
adjust the measure of importance for each of the attribute records in the user population relative to the one or more segments based on the correlation factor; and
identify a set of user identifiers that satisfies a similarity condition relative to the one or more segments, the set of user identifiers identified based at least in part on attribute records associated with the set of user identifiers and an adjusted measure of importance for each of the attribute records associated with the set of user identifiers.

11. The apparatus of claim 10, wherein the instructions are further executable by the processor to cause the apparatus to:
receive additional user identifiers and additional attribute records associated with the additional user identifiers;
modify the user population based on the additional attribute records associated with the additional user identifiers to generate a modified user population; and
calculate the measure of importance for each of the additional attribute records based at least in part on a probability that a particular additional user identifier is classified in each of the one or more segments given that the particular additional user identifier is associated with each additional attribute record and given that the particular additional user identifier is not associated with each additional attribute record, wherein the set of user identifiers includes additional user identifiers and the identifying is based at least in part on the calculated measure of importance for each of the additional attribute records.

12. The apparatus of claim 11, wherein the instructions to modify the user population further are executable by the processor to cause the apparatus to:
identify user identifiers that are associated with attribute records overlapping with the additional attribute records associated with the additional user identifiers; and
select the user identifiers, as the modified user population, that are associated with the attribute records overlapping with the attribute records associated with the additional user identifiers.

13. The apparatus of claim 10, wherein the instructions are further executable by the processor to cause the apparatus to:
receive additional attribute records associated with one or more of the plurality of user identifiers;
modify the attribute records associated with the plurality of user identifiers based on the additional attribute records responsive to determining that a delta of a number of user identifiers associated with the one or more segments does not satisfy a reach condition; and
prevent modification of the attribute records associated with the plurality of user identifiers responsive to determining that that the delta of the number of user identifiers associated with the one or more segments satisfies the reach condition.

14. The apparatus of claim 10, wherein the set of user identifiers are identified relative to a base segment, the base segment based on one or more of the attribute records in the user population.

15. A non-transitory computer-readable medium storing code for database processing, the code comprising instructions executable by a processor to:
classify a plurality of user identifiers into one or more segments based at least in part on attribute records associated with the plurality of user identifiers, the plurality of user identifiers being members of a user population;
calculate a measure of importance for each of the attribute records relative to classification in the one or more segments of the plurality of user identifiers, the calculation being based at least in part on a probability that a particular user identifier is classified in each of the one or more segments given that either the particular user identifier is associated with each attribute record or that the particular user identifier is not associated with each attribute record;
identify, for a segment of the one or more segments, a degree of overlap for an attribute record with the segment, the degree of overlap based on a number of user identifiers in the segment associated with the attribute record relative to a total number of user identifiers in the user population that are associated with the attribute record;
perform the identifying for each of the one or more segments and each of the attribute records relative to the one or more segments;

determine an average of the degree of overlap for each of the one or more segments;

generate a correlation factor based on the average that reflects a correlation of attribute records in the user population relative to the one or more segments;

adjust the measure of importance for each of the attribute records in the user population relative to the one or more segments based on the correlation factor; and identify a set of user identifiers that satisfies a similarity condition relative to the one or more segments, the set of user identifiers identified based at least in part on attribute records associated with the set of user identifiers and an adjusted measure of importance for each of the attribute records associated with the set of user identifiers.

16. The non-transitory computer-readable medium of claim 15, wherein the instructions are further executable to:

receive additional user identifiers and additional attribute records associated with the additional user identifiers;

modify the user population based on the additional attribute records associated with the additional user identifiers to generate a modified user population; and calculate the measure of importance for each of the additional attribute records based at least in part on a probability that a particular additional user identifier is classified in each of the one or more segments given that the particular additional user identifier is associated with each additional attribute record and given that the particular additional user identifier is not associated with each additional attribute record, wherein the set of user identifiers includes additional user identifiers and the identifying is based at least in part on the calculated measure of importance for each of the additional attribute records.

17. The non-transitory computer-readable medium of claim 16, wherein the instructions to modify the user population further are executable to:

identify user identifiers that are associated with attribute records overlapping with the additional attribute records associated with the additional user identifiers; and select the user identifiers, as the modified user population, that are associated with the attribute records overlapping with the attribute records associated with the additional user identifiers.

18. The non-transitory computer-readable medium of claim 15, wherein the instructions are further executable to:

receive additional attribute records associated with one or more of the plurality of user identifiers;

modify the attribute records associated with the plurality of user identifiers based on the additional attribute records responsive to determining that a delta of a number of user identifiers associated with the one or more segments does not satisfy a reach condition; and prevent modification of the attribute records associated with the plurality of user identifiers responsive to determining that that the delta of the number of user identifiers associated with the one or more segments satisfies the reach condition.

\* \* \* \* \*